US011936764B1

(12) United States Patent
Shcherbakov et al.

(10) Patent No.: US 11,936,764 B1
(45) **Date of Patent: *Mar. 19, 2024**

(54) GENERATING EVENT STREAMS BASED ON APPLICATION-LAYER EVENTS CAPTURED BY REMOTE CAPTURE AGENTS

(71) Applicant: Splunk Inc., San Francisco, CA (US)

(72) Inventors: Vladimir A. Shcherbakov, Pleasanton, CA (US); Michael R. Dickey, Palo Alto, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,041

(22) Filed: Jul. 14, 2022

Related U.S. Application Data

(63) Continuation of application No. 17/010,685, filed on Sep. 2, 2020, now Pat. No. 11,425,229, which is a continuation of application No. 16/459,573, filed on Jul. 1, 2019, now Pat. No. 10,805,438, which is a continuation of application No. 15/665,268, filed on Jul. 31, 2017, now Pat. No. 10,382,599, which is a continuation of application No. 14/528,898, filed on Oct. 30, 2014, now Pat. No. 9,838,512.

(51) Int. Cl.
*H04L 69/22* (2022.01)
*H04L 67/10* (2022.01)

(52) U.S. Cl.
CPC .............. *H04L 69/22* (2013.01); *H04L 67/10* (2013.01)

(58) Field of Classification Search
CPC ..... G06F 16/26; H04L 63/1433; H04L 69/22; H04L 67/10; H04L 12/26; H04L 29/06; H04L 29/08; H04L 43/022; H04L 43/045; H04L 63/143; H04L 43/02
See application file for complete search history.

(56) References Cited

U.S. PATENT DOCUMENTS 3,301,745 A 1/1967 Sydney et al.
5,044,401 A 9/1991 Giesler et al.
(Continued)

FOREIGN PATENT DOCUMENTS

WO 2011/134739 A1 11/2011

OTHER PUBLICATIONS

Non-Final Office Action, U.S. Appl. No. 16/459,573, dated Feb. 28, 2020, 10 pages.
(Continued)

*Primary Examiner* — Wei Zhao
(74) *Attorney, Agent, or Firm* — Nicholson De Vos Webster & Elliott LLP

(57) ABSTRACT

The disclosed embodiments provide a system that processes network data. During operation, the system obtains, at a remote capture agent, a first protocol classification for a first packet flow captured by the remote capture agent. Next, the system uses configuration information associated with the first protocol classification to build a first event stream from the first packet flow at the remote capture agent, wherein the first event stream comprises time-series event data generated from network packets in the first packet flow based on the first protocol classification. The system then transmits the first event stream over a network for subsequent storage and processing of the first event stream by one or more components on the network.

20 Claims, 17 Drawing Sheets

(56) References Cited

U.S. PATENT DOCUMENTS 5,436,618 A 7/1995 Van Steenbrugge
5,787,253 A 7/1998 McCreery et al.
5,796,942 A 8/1998 Esbensen
5,892,903 A 4/1999 Klaus
5,920,711 A 7/1999 Seawright et al.
5,983,270 A 11/1999 Abraham et al.
6,044,401 A 3/2000 Harvey
6,108,782 A 8/2000 Fletcher et al.
6,418,471 B1 7/2002 Shelton et al.
6,542,861 B1 4/2003 Lyles et al.
6,584,501 B1 6/2003 Cartsonis et al.
6,587,969 B1 7/2003 Weinberg et al.
6,594,634 B1 7/2003 Hampton et al.
6,643,694 B1 11/2003 Chernin
6,708,292 B1 3/2004 Mangasarian
6,792,460 B2 9/2004 Oulu et al.
6,810,494 B2 10/2004 Weinberg et al.
6,892,167 B2 5/2005 Polan et al.
6,898,556 B2 5/2005 Smocha et al.
6,915,308 B1 7/2005 Evans et al.
6,973,489 B1 12/2005 Levy
6,978,301 B2 12/2005 Tindal
6,985,944 B2 1/2006 Aggarwal
6,988,141 B1 1/2006 Motoyama et al.
6,996,779 B2 2/2006 Meandzija et al.
7,054,924 B1 5/2006 Harvey et al.
7,080,399 B1 7/2006 Yanagawa et al.
7,150,037 B2 12/2006 Wolf et al.
7,177,441 B2 2/2007 Condon et al.
7,197,559 B2 3/2007 Goldstein et al.
7,219,138 B2 5/2007 Straut et al.
7,228,348 B1 6/2007 Farley et al.
7,231,445 B1 6/2007 Aweya et al.
7,245,623 B1 7/2007 Cheriton
7,246,101 B2 7/2007 Fu et al.
7,246,162 B2 7/2007 Tindal
7,257,719 B2 8/2007 Pandit et al.
7,260,846 B2 8/2007 Day
7,277,957 B2 10/2007 Rowley et al.
7,299,277 B1 11/2007 Moran et al.
7,376,896 B2 5/2008 Ullmann et al.
7,376,969 B1 5/2008 Njemanze et al.
7,380,272 B2 5/2008 Sharp et al.
7,444,263 B2 10/2008 White et al.
7,539,489 B1 5/2009 Alexander
7,543,051 B2 6/2009 Greifeneder et al.
7,577,623 B2 8/2009 Genty et al.
7,594,011 B2 9/2009 Chandra
7,594,269 B2 9/2009 Durham et al.
7,607,170 B2 10/2009 Chesla
7,610,344 B2 10/2009 Mehr et al.
7,623,463 B2 11/2009 Chavda
7,644,438 B1 1/2010 Dash et al.
7,650,396 B2 1/2010 Tindal
7,650,634 B2 1/2010 Zuk
7,660,892 B2 2/2010 Choong et al.
7,702,806 B2 4/2010 Gil et al.
7,729,240 B1 6/2010 Crane et al.
7,738,396 B1 6/2010 Turner et al.
7,751,393 B2 7/2010 Chaskar et al.
7,761,918 B2 7/2010 Gula et al.
7,797,443 B1 9/2010 Pettigrew et al.
RE41,903 E 10/2010 Wenig et al.
7,814,218 B1 10/2010 Knee et al.
7,818,370 B2 10/2010 Piper et al.
7,836,498 B2 11/2010 Poletto et al.
7,869,352 B1 1/2011 Turner et al.
7,886,054 B1 2/2011 Nag et al.
7,899,444 B2 3/2011 Hans et al.
7,948,889 B2 5/2011 Lalonde et al.
7,953,425 B2 5/2011 Jordan
7,954,109 B1 5/2011 Durham et al.
7,962,616 B2 6/2011 Kupferman et al.
7,979,555 B2 7/2011 Rothstein et al.
8,019,064 B2 9/2011 Bedingfield et al.
8,020,211 B2 9/2011 Keanini et al.
8,032,564 B2 10/2011 Muret et al.
8,037,175 B1 10/2011 Apte et al.
8,042,055 B2 10/2011 Wenig et al.
8,056,130 B1 11/2011 Njemanze et al.
8,064,350 B2 11/2011 Peterman et al.
8,068,986 B1 11/2011 Shahbazi et al.
8,095,640 B2 1/2012 Guingo et al.
8,103,765 B2 1/2012 Greifeneder et al.
8,122,006 B2 2/2012 de Castro Alves et al.
8,125,908 B2 2/2012 Rothstein et al.
8,127,000 B2 2/2012 Wenig et al.
8,140,665 B2 3/2012 Malloy et al.
8,144,609 B2 3/2012 Rao
8,185,953 B2 5/2012 Rothstein et al.
8,191,136 B2 5/2012 Dudfield et al.
8,195,661 B2 6/2012 Kalavade
8,248,958 B1 8/2012 Tulasi et al.
8,255,511 B1 8/2012 Moore et al.
8,266,271 B2 9/2012 Oyadomari et al.
8,301,745 B1 10/2012 Wohlgemuth et al.
8,335,848 B2 12/2012 Wenig et al.
8,358,591 B2 1/2013 Chuang et al.
8,385,532 B1 2/2013 Geist et al.
8,386,371 B2 2/2013 Kittelsen et al.
8,386,598 B2 2/2013 Robinson
8,387,076 B2 2/2013 Thatte et al.
8,392,553 B2 3/2013 Petropoulakis et al.
8,473,620 B2 6/2013 Demmer et al.
8,498,956 B2 7/2013 Srinivasan et al.
8,522,219 B2 8/2013 Schwarzbauer et al.
8,533,532 B2 9/2013 Wenig et al.
8,543,534 B2 9/2013 Alves et al.
8,549,650 B2 10/2013 Hanson
8,578,002 B1 11/2013 Roesch et al.
8,582,567 B2 * 11/2013 Kurapati ............. H04M 7/0078 370/352
8,583,772 B2 11/2013 Wenig et al.
8,589,375 B2 11/2013 Zhang et al.
8,589,436 B2 11/2013 Srinivasan et al.
8,589,876 B1 11/2013 Neeman
8,601,122 B2 12/2013 Malloy et al.
8,667,121 B2 3/2014 Ahuja et al.
8,676,841 B2 3/2014 Srinivasan et al.
8,682,308 B2 3/2014 De et al.
8,782,787 B2 7/2014 Willibeek-Lemair et al.
8,806,361 B1 8/2014 Noel et al.
8,842,548 B2 9/2014 Pleshek et al.
8,850,064 B2 9/2014 Mann et al.
8,850,182 B1 9/2014 Fritz et al.
8,874,736 B2 10/2014 Levi et al.
8,918,430 B2 12/2014 Fischer
8,958,318 B1 2/2015 Hastwell et al.
8,978,034 B1 3/2015 Goodson et al.
8,996,668 B2 3/2015 Tan et al.
9,043,439 B2 5/2015 Bicket et al.
9,098,587 B2 8/2015 Deshmukh et al.
9,110,101 B2 8/2015 Pietrowicz et al.
9,112,915 B2 8/2015 Su
9,118,538 B1 8/2015 Lekkalapudi et al.
9,189,449 B2 11/2015 Branson et al.
9,203,707 B1 12/2015 Hasija et al.
9,244,978 B2 1/2016 Alves et al.
9,305,238 B2 4/2016 Srinivasan et al.
9,330,395 B2 5/2016 Hauser
9,405,854 B2 8/2016 Jerzak et al.
9,542,708 B2 1/2017 Piper et al.
9,558,225 B2 1/2017 Skrzypczak et al.
9,736,227 B2 8/2017 Cook
9,838,512 B2 12/2017 Shcherbakov et al.
2002/0015387 A1 2/2002 Houh
2002/0069275 A1 6/2002 Tindal
2002/0093527 A1 7/2002 Sherlock et al.
2003/0061506 A1 3/2003 Cooper et al.
2003/0101449 A1 5/2003 Bentolila et al.
2003/0120619 A1 6/2003 Osborn
2003/0135612 A1 7/2003 Huntington et al.
2003/0191599 A1 10/2003 Bartsch
2003/0221000 A1 11/2003 Cherkasova et al.

(56) References Cited

U.S. PATENT DOCUMENTS

2004/0015579 A1 1/2004 Cooper et al.
2004/0030796 A1 2/2004 Cooper et al.
2004/0042470 A1 3/2004 Cooper et al.
2004/0044912 A1 3/2004 Connary et al.
2004/0088405 A1 5/2004 Aggarwal
2004/0109453 A1 6/2004 Wirth
2004/0114576 A1 6/2004 Itoh et al.
2004/0152444 A1 8/2004 Lialiamou et al.
2004/0268150 A1 12/2004 Aaron
2005/0021715 A1 1/2005 Dugatkin et al.
2005/0027858 A1 2/2005 Sloth et al.
2005/0060402 A1 3/2005 Oyadomari et al.
2005/0120160 A1 6/2005 Plouffe et al.
2005/0131876 A1 6/2005 Ahuja et al.
2005/0138013 A1 6/2005 Walker et al.
2005/0138426 A1 6/2005 Styslinger
2005/0273593 A1 12/2005 Seminaro et al.
2005/0278731 A1 12/2005 Cameron et al.
2006/0047721 A1 3/2006 Narang et al.
2006/0077895 A1 4/2006 Wright
2006/0101101 A1 5/2006 Pandit et al.
2006/0198318 A1 9/2006 Schondelmayer et al.
2006/0256735 A1 11/2006 Borowski
2006/0279628 A1 12/2006 Fleming
2007/0011309 A1 1/2007 Brady et al.
2007/0013936 A1 1/2007 Ishimoto
2007/0033408 A1 2/2007 Morten
2007/0043861 A1 2/2007 Baron et al.
2007/0050846 A1 3/2007 Xie et al.
2007/0067450 A1 3/2007 Malloy et al.
2007/0076312 A1 4/2007 Jordan
2007/0083644 A1 4/2007 Miller et al.
2007/0106692 A1 5/2007 Klein
2007/0121872 A1 5/2007 Hans et al.
2007/0150584 A1 6/2007 Srinivasan
2007/0156916 A1 7/2007 Schiefer
2007/0208852 A1 9/2007 Wexler et al.
2007/0260932 A1 11/2007 Prichard et al.
2008/0056139 A1 3/2008 Liaqat
2008/0082679 A1 4/2008 Dobtchev
2008/0159146 A1 7/2008 Claudatos et al.
2008/0184248 A1 7/2008 Barua et al.
2008/0209505 A1 8/2008 Ghai et al.
2008/0259910 A1 10/2008 Bodin et al.
2008/0281963 A1 11/2008 Fletcher et al.
2009/0070786 A1 3/2009 Alves et al.
2009/0129316 A1 5/2009 Ramanathan et al.
2009/0228474 A1 9/2009 Chiu et al.
2009/0238088 A1 9/2009 Tan
2009/0267953 A1 10/2009 Sampsell et al.
2009/0271504 A1 10/2009 Ginter et al.
2009/0319247 A1 12/2009 Ratcliffe et al.
2010/0031274 A1 2/2010 Sim-Tang
2010/0064307 A1 3/2010 Malhotra et al.
2010/0070929 A1 3/2010 Behl et al.
2010/0077286 A1 3/2010 Guagenti et al.
2010/0095370 A1 4/2010 Lee et al.
2010/0136943 A1* 6/2010 Hirvela .................. H04W 4/00 709/217
2010/0153316 A1 6/2010 Duffield et al.
2010/0172246 A1 7/2010 Adam et al.
2010/0318665 A1 12/2010 Demmer et al.
2010/0318836 A1 12/2010 Ness et al.
2011/0026521 A1 2/2011 Gamage et al.
2011/0029665 A1 2/2011 Wenig et al.
2011/0106935 A1 5/2011 Srinivasan
2011/0145715 A1 6/2011 Malloy et al.
2011/0166982 A1 7/2011 Cole et al.
2011/0178775 A1 7/2011 Schoening et al.
2011/0231935 A1 9/2011 Gula et al.
2011/0238723 A1 9/2011 Weintraub et al.
2011/0246134 A1 10/2011 Frishberg et al.
2011/0256869 A1 10/2011 Zhang et al.
2011/0292818 A1 12/2011 Zhytar et al.
2011/0296015 A1 12/2011 Chakravarty et al.
2011/0302305 A1 12/2011 Morimura et al.
2012/0017270 A1 1/2012 Bartholomay et al.
2012/0054246 A1 3/2012 Fischer
2012/0084437 A1 4/2012 Wenig et al.
2012/0106354 A1 5/2012 Pleshek et al.
2012/0158987 A1 6/2012 Greifeneder et al.
2012/0173966 A1 7/2012 Powell et al.
2012/0179816 A1 7/2012 Malloy et al.
2012/0197934 A1 8/2012 Zhang et al.
2012/0198047 A1 8/2012 Steuer et al.
2012/0239681 A1 9/2012 Zhang et al.
2012/0309377 A1 12/2012 De et al.
2013/0024431 A1 1/2013 Parthasarathy et al.
2013/0039405 A1* 2/2013 Goto .................. H03M 13/296 375/229
2013/0067034 A1 3/2013 Degioanni et al.
2013/0070622 A1 3/2013 Degioanni et al.
2013/0080620 A1 3/2013 Cook
2013/0091278 A1 4/2013 Ludwig et al.
2013/0111011 A1 5/2013 Moulhaud et al.
2013/0114456 A1 5/2013 Dahod
2013/0128742 A1 5/2013 Yu
2013/0132833 A1 5/2013 White et al.
2013/0136253 A1 5/2013 Liberman et al.
2013/0170435 A1 7/2013 Dinan
2013/0173782 A1 7/2013 Ragutski et al.
2013/0179855 A1 7/2013 Elliott
2013/0182700 A1 7/2013 Figura et al.
2013/0198391 A1 8/2013 Weissblum
2013/0212689 A1 8/2013 Ben-Natan et al.
2013/0227689 A1 8/2013 Pietrowicz et al.
2013/0232137 A1 9/2013 Knott
2013/0246925 A1 9/2013 Ahuja et al.
2013/0258995 A1 10/2013 Skov et al.
2013/0276000 A1 10/2013 Neeman
2013/0282892 A1 10/2013 Levi et al.
2013/0318236 A1 11/2013 Coates et al.
2013/0318514 A1 11/2013 Neeman
2013/0318536 A1 11/2013 Fletcher et al.
2013/0318603 A1 11/2013 Merza
2013/0318604 A1 11/2013 Coates et al.
2013/0326620 A1 12/2013 Merza et al.
2014/0012864 A1 1/2014 Nakagawa
2014/0013309 A1 1/2014 Gounares
2014/0046645 A1 2/2014 White et al.
2014/0068102 A1 3/2014 Mann et al.
2014/0173512 A1 6/2014 Karpov et al.
2014/0201375 A1 7/2014 Beereddy et al.
2014/0226817 A1 8/2014 Von Huben et al.
2014/0230062 A1 8/2014 Kumaran
2014/0237292 A1 8/2014 Chan
2014/0280737 A1 9/2014 Bicket et al.
2014/0317228 A1 10/2014 Dharmasanam
2014/0317684 A1 10/2014 Porras et al.
2014/0325058 A1 10/2014 Fletcher et al.
2014/0325363 A1 10/2014 Fletcher et al.
2014/0328189 A1 11/2014 Fallon et al.
2014/0344708 A1 11/2014 Carr et al.
2014/0351415 A1 11/2014 Harrigan et al.
2015/0013006 A1 1/2015 Shulman et al.
2015/0062113 A1 3/2015 Cannon et al.
2015/0095359 A1 4/2015 Duxbury
2015/0120820 A1 4/2015 Cook
2015/0125807 A1 5/2015 Shipley
2015/0156170 A1 6/2015 Gurbani
2015/0178342 A1 6/2015 Seering et al.
2015/0180891 A1 6/2015 Seward et al.
2015/0295766 A1 10/2015 Dickey
2015/0319058 A1 11/2015 Molinero et al.
2016/0028758 A1 1/2016 Ellis et al.
2016/0112262 A1 4/2016 Johnson et al.
2016/0127517 A1 5/2016 Shcherbakov et al.
2016/0155314 A1 6/2016 Snyder
2016/0182283 A1 6/2016 Mann et al.
2016/0323172 A1 11/2016 Friend
2016/0330086 A1 11/2016 Oda et al.
2016/0350722 A1 12/2016 Walker et al.
2017/0142068 A1 5/2017 Devarajan et al.
2017/0150037 A1 5/2017 Rathod

(56) References Cited

U.S. PATENT DOCUMENTS

| | | | |
|---|---|---|---|
| 2017/0286505 A1 | 10/2017 | Lamas et al. |
| 2017/0310741 A1 | 10/2017 | Cook |
| 2017/0322972 A1 | 11/2017 | Lee et al. |
| 2018/0013692 A1 | 1/2018 | Park et al. |

OTHER PUBLICATIONS

Notice of Allowance from U.S. Appl. No. 15/799,158, dated Nov. 29, 2018, 9 pages.
Notice of Allowance from U.S. Appl. No. 14/253,744, dated Nov. 15, 2017, 12 pages.
Notice of Allowance from U.S. Appl. No. 14/253,744, dated Nov. 27, 2017, 12 pages.
Notice of Allowance from U.S. Appl. No. 14/253,753, dated Feb. 27, 2017, 19 pages.
Notice of Allowance from U.S. Appl. No. 14/253,753, dated Jun. 12, 2017, 16 pages.
Notice of Allowance from U.S. Appl. No. 14/253,753, dated May 23, 2017, 2 pages.
Notice of Allowance from U.S. Appl. No. 14/253,753, dated Nov. 8, 2016, 7 pages.
Notice of Allowance from U.S. Appl. No. 14/528,898, dated May 8, 2017, 29 pages.
Notice of allowance from U.S. Appl. No. 14/528,898, dated Nov. 28, 2016, 8 pages.
Notice of Allowance from U.S. Appl. No. 14/528,898, dated Sep. 13, 2017, 22 pages.
Notice of Allowance from U.S. Appl. No. 14/528,918, dated Aug. 18, 2016, 5 pages.
Notice of Allowance from U.S. Appl. No. 14/528,918, dated Dec. 21, 2016, 26 pages.
Notice of Allowance from U.S. Appl. No. 15/421,269, dated Nov. 13, 2017, 9 pages.
Notice of Allowance from U.S. Appl. No. 15/421,269, dated Sep. 8, 2017, 12 pages.
Notice of Allowance from U.S. Appl. No. 15/799,167, dated Sep. 14, 2018, 16 pages.
Notice of Allowance, U.S. Appl. No. 16/459,573, dated Jun. 11, 2020, 8 pages.
Notice of Allowance, U.S. Appl. No. 16/384,688, dated Feb. 19, 2020, 8 pages.
Supplemental Notice of Allowability, U.S. Appl. No. 16/384,688, dated May 28, 2020, 2 pages.
Wires hark User's Guide for Wires hark 1.9 (Oct. 18, 2012) http://wayback.archive.org/web/20121018193345/http://www.wireshark.org/do- wnload/docs/user-guide-us.pdf; dated Oct. 18, 2012; last accessed Nov. 29, 2016).
Zabbix Network Monitoring Essentials Tutorial Video, Retrieved from https://www.youtube.com/watch? ,=NLtqR6yKWM&list=PLYoq8isOGa N7mT714k2191CFdg2064wj&index=17 on Oct. 22, 2013, 1 page.
Advisory Action from U.S. Appl. No. 14/253,753, dated Apr. 29, 2016, 2 pages.
Advisory Action from U.S. Appl. No. 14/253,753, dated May 7, 2015, 2 pages.
Advisory Action from U.S. Appl. No. 14/253,767, dated Mar. 1, 2016, 3 pages.
Advisory Action from U.S. Appl. No. 14/528,932, dated Jul. 14, 2017, 8 pages.
Advisory Action from U.S. Appl. No. 14/609,292, dated Dec. 8, 2017, 5 pages.
Final Office Action from U.S. Appl. No. 14/528,932, dated Jun. 28, 2018, 29 pages.
Final Office action from U.S. Appl. No. 14/253,713, dated Dec. 22, 2017, 46 pages.
Final Office Action from U.S. Appl. No. 14/253,713, dated Feb. 10, 2015, 15 pages.
Final Office Action from U.S. Appl. No. 14/253,713, dated Feb. 12, 2016, 17 pages.
Final Office Action from U.S. Appl. No. 14/253,744, dated Feb. 21, 2017, 41 pages.
Final Office Action from U.S. Appl. No. 14/253,744, dated Jan. 9, 2015, 29 pages.
Final Office Action from U.S. Appl. No. 14/253,744, dated Oct. 23, 2015, 51 pages.
Final Office Action from U.S. Appl. No. 14/253,753, dated Feb. 4, 2016, 17 pages.
Final Office Action from U.S. Appl. No. 14/253,753, dated Mar. 2, 2015, 19 pages.
Final Office Action from U.S. Appl. No. 14/253,767, dated Apr. 18, 2017, 34 pages.
Final Office Action from U.S. Appl. No. 14/253,767, dated Dec. 16, 2015, 21 pages.
Final Office Action from U.S. Appl. No. 14/253,767, dated Jan. 7, 2015, 14 pages.
Final Office Action from U.S. Appl. No. 14/528,898, dated Jun. 29, 2016, 18 pages.
Final Office Action from U.S. Appl. No. 14/528,932, dated May 5, 2017, 38 pages.
Final Office Action from U.S. Appl. No. 14/609,292, dated Aug. 25, 2017, 39 pages.
Final Office Action from U.S. Appl. No. 14/610,457, dated Jan. 22, 2018, 51 pages.
Fiodin, et al., "Processing Object-Oriented Queries with Invertible Late Bound Functions," Proceedings of the 21st VLDB Conference, 1995, pp. 335-344.
Non-Final Office Action from U.S. Appl. No. 15/799,167, dated May 23, 2018, 54 pages.
Non-Final Office Action from U.S. Appl. No. 14/528,932, dated Feb. 12, 2018, 45 pages.
Non-Final Office Action from U.S. Appl. No. 15/799,158, dated Aug. 8, 2018, 52 pages.
Non-Final Office Action from U.S. Appl. No. 14/253,713, dated Aug. 12, 2015, 17 pages.
Non-Final Office Action from U.S. Appl. No. 14/253,713, dated Jan. 19, 2017, 31 pages.
Non-Final Office Action from U.S. Appl. No. 14/253,713, dated Sep. 3, 2014, 26 pages.
Non-Final Office Action from U.S. Appl. No. 14/253,744, dated Jul. 5, 2016, 31 pages.
Non-Final Office Action from U.S. Appl. No. 14/253,744, dated Jun. 10, 2015, 50 pages.
Non-Final Office Action from U.S. Appl. No. 14/253,744, dated Jun. 16, 2017, 31 pages.
Non-Final Office Action from U.S. Appl. No. 14/253,744, dated Oct. 6, 2014, 34 pages.
Non-Final Office Action from U.S. Appl. No. 14/253,753, dated Jul. 1, 2016, 21 pages.
Non-Final Office Action from U.S. Appl. No. 14/253,753, dated Jul. 28, 2015, 14 pages.
Non-Final Office Action from U.S. Appl. No. 14/253,753, dated Sep. 5, 2014, 16 pages.
Non-Final Office Action from U.S. Appl. No. 14/253,767, dated Jul. 15, 2015, 17 pages.
Non-Final Office Action from U.S. Appl. No. 14/253,767, dated Jun. 19, 2014, 13 pages.
Non-Final Office Action from U.S. Appl. No. 14/253,767, dated Sep. 19, 2016, 21 pages.
Non-Final Office Action from U.S. Appl. No. 14/528,898, dated Mar. 31, 2016, 17 pages.
Non-Final Office Action from U.S. Appl. No. 14/528,918, dated Feb. 17, 2016, 17 pages.
Non-Final Office Action from U.S. Appl. No. 14/528,932, dated Dec. 14, 2016, 19 pages.
Non-Final Office Action from U.S. Appl. No. 14/609,292, dated Apr. 12, 2017, 43 pages.
Non-Final Office Action from U.S. Appl. No. 14/610,457, dated Aug. 4, 2017, 79 pages.
Non-Final Office Action from U.S. Appl. No. 14/699,787, dated Sep. 21, 2017, 67 pages.

(56) References Cited

OTHER PUBLICATIONS

Non-Final Office action from U.S. Appl. No. 14/699,807, dated Dec. 28, 2017, 60 pages.
Non-Final Office Action from U.S. Appl. No. 15/421,269, dated Jul. 10, 2017, 39 pages.
Non-Final Office Action from U.S. Appl. No. 15/582,309, dated Sep. 22, 2017, 46 pages.
Non-Final Office Action, U.S. Appl. No. 16/228,509, dated Feb. 18, 2020, 11 pages.
Non-Final Office Action, U.S. Appl. No. 16/384,688, dated Oct. 24, 2019, 10 pages.
Non-Final Office Action, U.S. Appl. No. 17/010,685, dated Jan. 21, 2022, 10 pages.

* cited by examiner

Streams

410 Clone Stream

| Name | Description | Enabled | Cloned |
|---|---|---|---|
| AggregateHTTP | Aggregated HTTP Event Stream | ✓ | ✓ |
| DemoHTTP | Demo HTTP Stream with full content | ✓ | ✓ |
| dhcp | DHCP Protocol Events | | |
| dns | DNS Protocol Events | ✓ | |
| ftp | FTP Protocol Events | | |
| http | HTTP Protocol Events | ✓ | |
| imap | IMAP Protocol Events | | |
| irc | IRC Protocol Events | | |
| ldap | LDAP Protocol Events | | |
| mysql-command | MySQL Database Commands | | |
| mysql-login | MySQL Database Logins | | |
| mysql-query | MySQL Database Queries | ✓ | |
| nfs | NFS Protocol Events | | |
| pop3 | POP3 Protocol Events | | |
| postgres | PostgreSQL Database Events | | |
| radius | Radius Protocol Events | | |
| sip | SIP Protocol Events | ✓ | |
| smb | SMB Protocol Events | | |
| smtp | SMTP Protocol Events | | |
| tcp | TCP Flow Events | ✓ | |
| tds | Sybase/SQL Server Database Events | | |
| tns | Oracle (TNS) Protocol Events | | |
| udp | UDP Flow Events | ✓ | |

Configure Stream: DemoHTTP
Aggregated: ☐ — 436
Event Type: http.event
Filters: 0 filters configured

[ Enabled | Disabled ]  [ Clone ]  [ Delete ]  [ Cancel ]  [ Save ]
424      426           428        430         432         434

| Enable | Name | Description | Term | Add to filter |
|---|---|---|---|---|
| ☑ | dest_port | Server port number | flow.s-port | Add |
| ☑ | http_content_length | HTTP response content length | http.content-length | Add |
| ☑ | http_method | The HTTP method of the request (GET, POST, etc.) | http.method | Add |
| ☑ | http_referrer | The Referer HTTP request header | http.referer | Add |
| ☑ | http_user_agent | The User-Agent HTTP request header | http.useragent | Add |
| ☑ | server | The Server HTTP response header | http.server | Add |
| ☑ | site | The Host HTTP request header | http.host | Add |
| ☑ | src_ip | IP address of the client in dot-quad notation. Contains the value of x-Forwarded-For header or equal to flow.c-ip is X-Forwarded-For is not set. | http.c-ip | Add |
| ☑ | src_port | Client port number | flow.c-port | Add |
| ☑ | status | The HTTP status code returned to the client | http.status | Add |
| ☑ | time_taken | Number of microseconds that it took to complete a flow event, from the end user's perspective | flow.timetaken | Add |
| ☑ | uri_parm | The parameters portion of the requested resource | http.uri-parm | Add |
| ☑ | uri_path | The requested resource (excluding query) | http.uri-stem | Add |
| ☑ | uri_query | The query portion of the requested resource | http.uri-query | Add |
| ☐ | accept | The Accept HTTP request header | http.accept | Add |
| ☐ | ack_packets_in | The number of acknowledgement packets sent from client to server | flow.cs-ack-packets | Add |

422

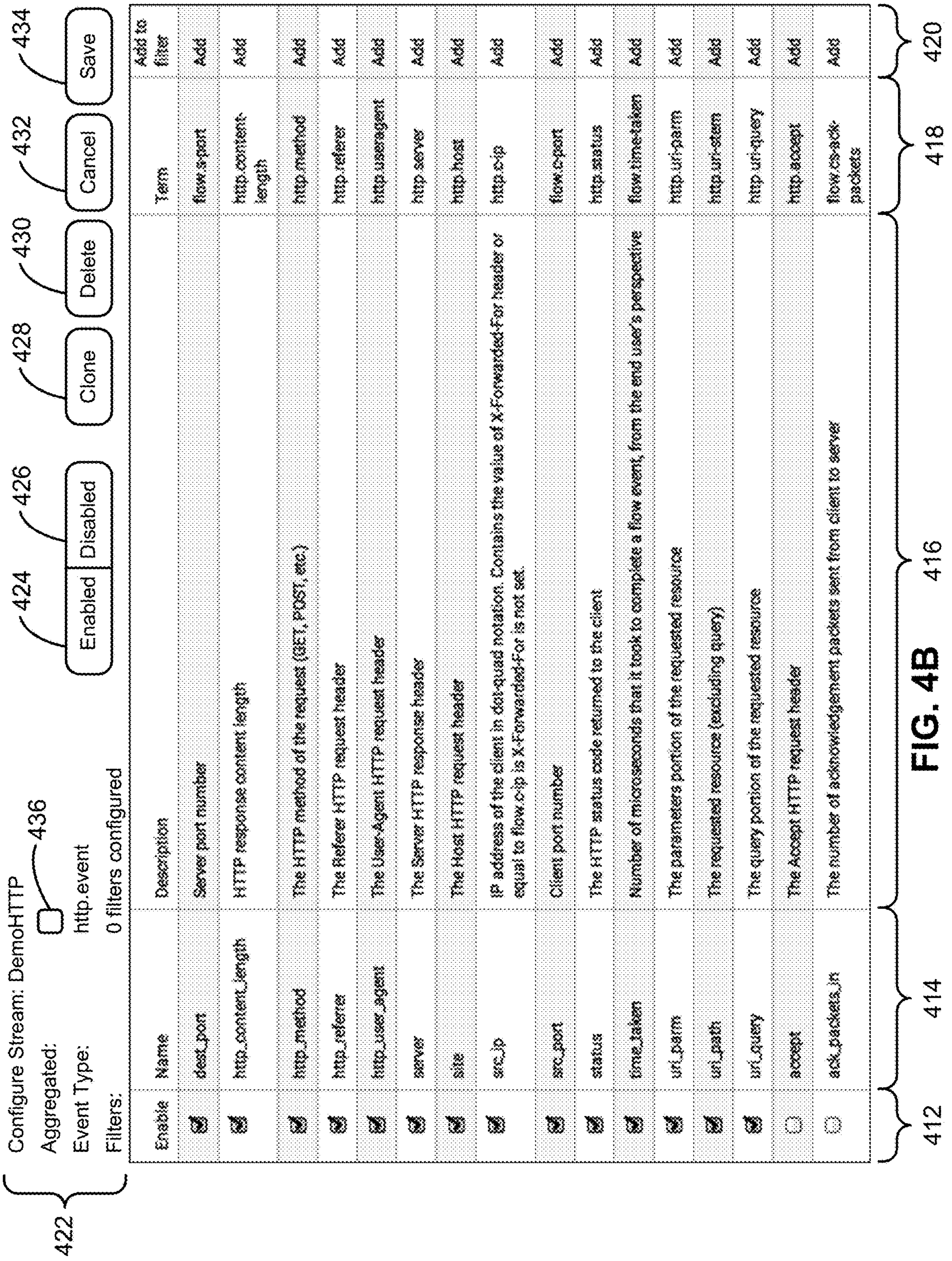

FIG. 4B

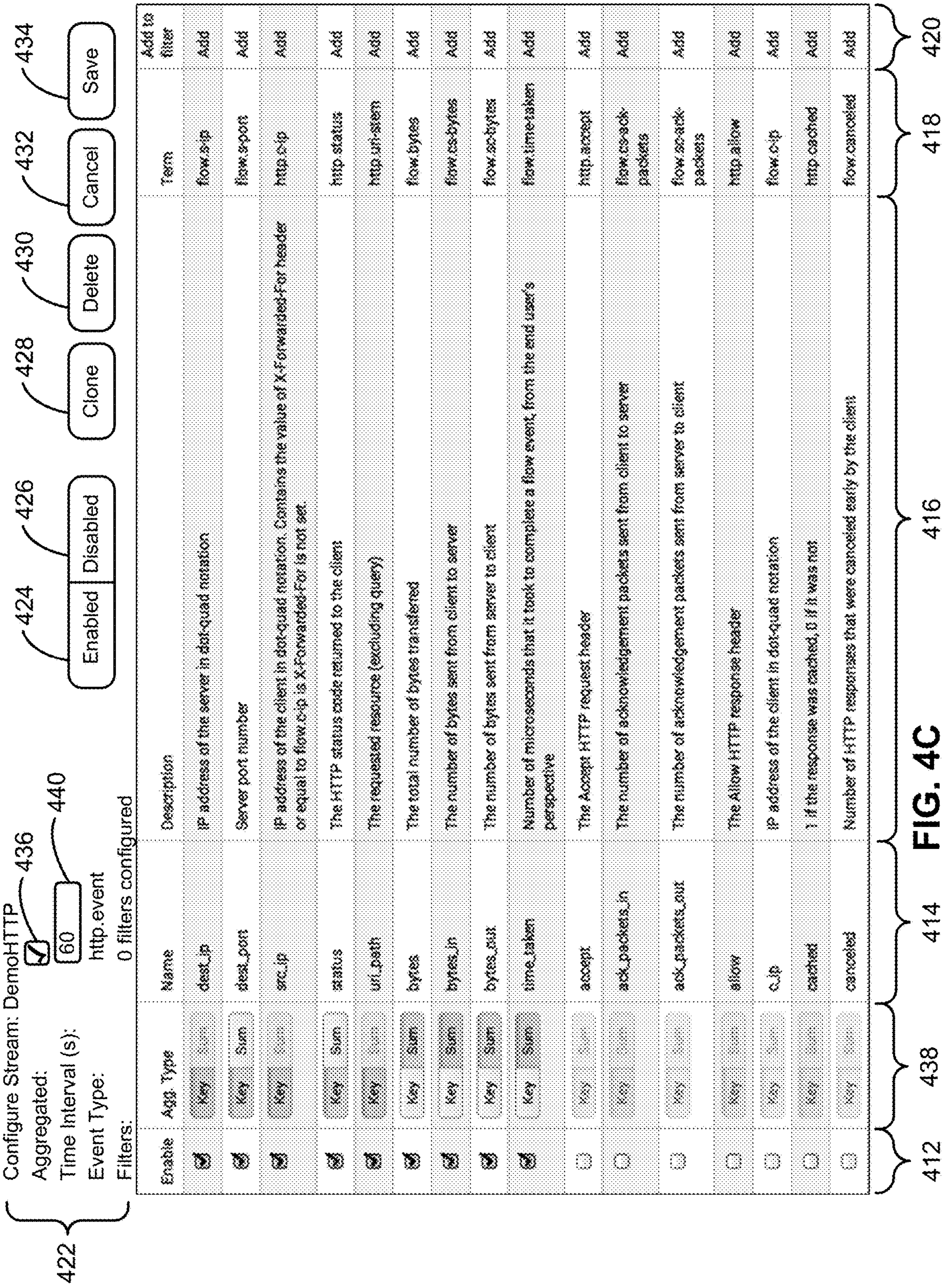

FIG. 4C

Configure Stream: DemoHTTP
Aggregated: ☑ — 436
Time Interval (s): [60] — 440
Event Type: http.event
Filters: 0 filters configured

[Enabled] [Disabled] — 424/426  [Clone] — 428  [Delete] — 430  [Cancel] — 432  [Save] — 434

| Enable | Agg. Type | Name | Description | Term | |
|---|---|---|---|---|---|
| ☑ | Key | dest_ip | IP address of the server in dot-quad notation | flow.s-ip | Add to filter |
| ☑ | Key Sum | dest_port | Server port number | flow.sport | Add |
| ☑ | Key Sum | src_ip | IP address of the client in dot-quad notation. Contains the value of X-Forwarded-For header or equal to flow.c-ip is X-Forwarded-For is not set. | http.c-ip | Add |
| ☑ | Key | status | The HTTP status code returned to the client | http.status | Add |
| ☑ | Key | url_path | The requested resource (excluding query) | http.uri-stem | Add |
| ☑ | Key Sum | bytes | The total number of bytes transferred | flow.bytes | Add |
| ☑ | Key Sum | bytes_in | The number of bytes sent from client to server | flow.cs-bytes | Add |
| ☑ | Key Sum | bytes_out | The number of bytes sent from server to client | flow.sc-bytes | Add |
| ☑ | Key Sum | time_taken | Number of microseconds that it took to complete a flow event from the end user's perspective | flow.time-taken | Add |
| ☐ | Key | accept | The Accept HTTP request header | http.accept | Add |
| ☐ | Key | ack_packets_in | The number of acknowledgement packets sent from client to server | flow.cs-ack-packets | Add |
| ☐ | Key | ack_packets_out | The number of acknowledgement packets sent from server to client | flow.sc-ack-packets | Add |
| ☐ | Key | allow | The Allow HTTP response header | http.allow | Add |
| ☐ | Key | c_ip | IP address of the client in dot-quad notation | flow.c-ip | Add |
| ☐ | Key | cached | 1 if the response was cached, 0 if it was not | http.cached | Add |
| ☐ | Key | canceled | Number of HTTP responses that were cancelled early by the client | flow.canceled | Add |

| Time | Event |
| --- | --- |
| 9/27/14<br>9:25:07.566<br>AM | { [-]<br>bytes: 58516<br>bytes_in: 461<br>bytes_out: 58055<br>count: 1<br>dest_ip: 69.192.196.160<br>dest_port: 80<br>src_ip: 10.0.0.3<br>status: 200<br>time_taken: 408510<br>timestamp: 2014-09-27T16:25:07.566163Z<br>uri_path: /splunk/test.jpg<br>} |

GENERATING EVENT STREAMS BASED ON APPLICATION-LAYER EVENTS CAPTURED BY REMOTE CAPTURE AGENTS

RELATED APPLICATION

This application claims benefit under 35 U.S.C. § 120 as a continuation of U.S. application Ser. No. 17/010,685, filed Sep. 2, 2020, which is a continuation of U.S. application Ser. No. 16/459,573, filed Jul. 1, 2019, issued as U.S. Pat. No. 10,805,438, which is a continuation of U.S. application Ser. No. 15/665,268, filed Jul. 31, 2017, issued as U.S. Pat. No. 10,382,599, which is a continuation of U.S. application Ser. No. 14/528,898, filed Oct. 30, 2014, issued as U.S. Pat. No. 9,838,512, the entire contents of which are hereby incorporated by reference as if fully set forth herein. The applicant (s) hereby rescind any disclaimer of claim scope in the parent application(s) or the prosecution history thereof and advise the USPTO that the claims in this application may be broader than any claim in the parent application(s).

The subject matter of this application is related to the subject matter in a non-provisional application by inventor Michael Dickey, entitled "Distributed Processing of Network Data Using Remote Capture Agents," having Ser. No. 14/253,713, and filing date 15 Apr. 2014, issued as U.S. Pat. No. 10,127,273.

The subject matter of this application is also related to the subject matter in a non-provisional application by inventors Vladimir A. Shcherbakov, Michael R. Dickey, Cary Glen Noel, Kishore R. Ramasayam and Mignon L. Belongie, entitled "Streamlining Configuration of Protocol-Based Network Data Capture by Remote Capture Agents," having Ser. No. 14/528,932, and filed on 30 Oct. 2014.

The subject matter of this application is also related to the subject matter in a non-provisional application by inventors Vijay Chauhan, Devendra M. Badhani, Luke K. Murphey and David Hazekamp, entitled "Capture Triggers for Capturing Network Data," having Ser. No. 14/528,918, and filed on 30 Oct. 2014, issued as U.S. Pat. No. 9,596,253.

BACKGROUND

Field

The disclosed embodiments relate to techniques for processing network data. More specifically, the disclosed embodiments relate to techniques for performing protocol-based capture of network data using remote capture agents in a distributed network environment.

Related Art

Over the past decade, the age of virtualization has triggered a sea change in the world of network data capture. Almost every network capture product available today is a physical hardware appliance that customers have to purchase and configure. In addition, most network data capture technologies are built from scratch to serve a specific purpose and address the needs of a particular vertical market. For example, network capture systems may be customized to extract data for security and intrusion-detection purposes, collect network performance data, perform Quality of Service (QoS), redirect data, block network traffic, and/or perform other analysis or management of network traffic. Such targeted and/or fixed implementation and use of network capture technologies may preclude modification of the network capture technologies to address different and changing business needs.

Moreover, customers using conventional hardware-based network capture devices typically connect the devices to other hardware devices in a network. The connections may allow the network capture devices to access the network and monitor network traffic between two or more points in the network. Examples of such devices include a network Test Access Point (TAP) or Switched Port Analyzer (SPAN) port. After the network traffic is captured, cumbersome Extraction, Transform, and Load ("ETL") processes may be performed to filter, transform, and/or aggregate data from the network traffic and enable the extraction of business value from the data.

However, customers are moving away from managing physical servers and data centers and toward public and private cloud computing environments that provide software, hardware, infrastructure, and/or platform resources as hosted services using computing, storage, and/or network devices at remote locations. For these customers, it is either impossible, or at best extremely challenging, to deploy physical network capture devices and infrastructure in the cloud computing environments.

Consequently, network data capture may be facilitated by mechanisms for streamlining the deployment and configuration of network capture technology at distributed and/or remote locations.

SUMMARY

The disclosed embodiments provide a system that processes network data. During operation, the system obtains, at a remote capture agent, a first protocol classification for a first packet flow captured by the remote capture agent. Next, the system uses configuration information associated with the first protocol classification to build a first event stream from the first packet flow at the remote capture agent, wherein the first event stream includes time-series event data generated from network packets in the first packet flow based on the first protocol classification. The system then transmits the first event stream over a network for subsequent storage and processing of the first event stream by one or more components on the network.

In some embodiments, the system also obtains, at the remote capture agent, the configuration information from a configuration server over the network. Next, the system uses the configuration information to configure the generation of the time-series event data from the network packets during runtime of the remote capture agent.

In some embodiments, the system also obtains, at the remote capture agent, a second protocol classification for a second packet flow captured at the remote capture agent. Next, the system uses configuration information associated with the second protocol classification to build a second event stream from the second packet flow at the remote capture agent, wherein the second event stream includes time-series event data from network packets in the second packet flow based on the second protocol classification. The system then transmits the second event stream over the network.

In some embodiments, the system also identifies, at the remote capture agent, the network packets in the first packet flow based on control information in the network packets.

In some embodiments, the system also assembles the first packet flow from the network packets. Upon detecting encryption of the network packets in the first packet flow, the system decrypts the network packets in the first packet flow prior to obtaining the first protocol classification for the first packet flow.

In some embodiments, the network packets in the first packet flow are associated with at least one of a source, a destination, a network address, a port, and a transport layer protocol.

In some embodiments, using the configuration information associated with the first protocol classification to build the first event stream from the first packet flow at the remote capture agent includes:

(i) obtaining one or more event attributes associated with the first protocol classification from the configuration information;

(ii) extracting the one or more event attributes from the network packets in the first packet flow;

(iii) using the configuration information to transform the extracted one or more event attributes; and (iv) including the transformed one or more event attributes in the first event stream.

In some embodiments, the first protocol classification comprises at least one of a transport layer protocol, a session layer protocol, a presentation layer protocol, and an application layer protocol.

BRIEF DESCRIPTION OF THE FIGURES

FIG. 4A shows an exemplary screenshot in accordance with the disclosed embodiments.

FIG. 4B shows an exemplary screenshot in accordance with the disclosed embodiments.

FIG. 4C shows an exemplary screenshot in accordance with the disclosed embodiments.

FIG. 4F shows an exemplary screenshot in accordance with the disclosed embodiments.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
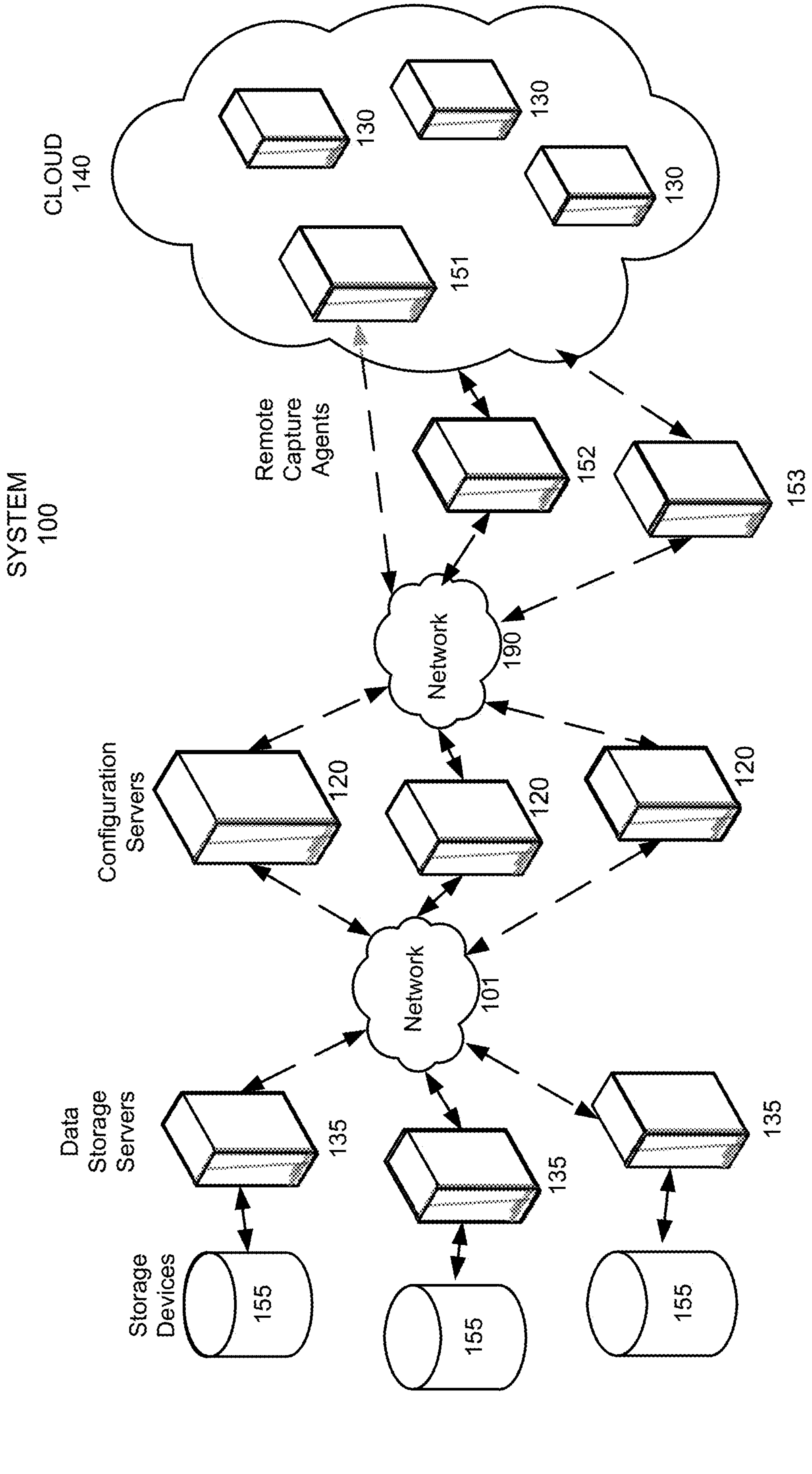
FIG. 1 shows a schematic of a system in accordance with the disclosed embodiments.

The disclosed embodiments provide a method and system for facilitating the processing of network data. As shown in FIG. 1, the network data may be captured using a data-processing system 100 in a distributed network environment. In the illustrated embodiment, system 100 includes a set of configuration servers 120 in communication with a set of remote capture agents 151-153 over one or more networks 190.

Although system 100 only depicts three configuration servers 120 and three remote capture agents 151-153, any number of configuration servers 120 and/or remote capture agents 151-153 may be configured to operate and/or communicate with one another within the data-processing system. For example, a single physical and/or virtual server may perform the functions of configuration servers 120. Alternatively, multiple physical and/or virtual servers or network elements may be logically connected to provide the functionality of configuration servers 120. The configuration server(s) may direct the activity of multiple distributed remote capture agents 151-153 installed on various client computing devices across one or more networks. In turn, remote capture agents 151-153 may be used to capture network data from multiple remote network data sources.

Further, embodiments described herein can be configured to capture network data in a cloud-based environment, such as cloud 140 depicted in the illustrated embodiment, and to generate events such as timestamped records of network activity from the network data. Remote capture agents 151-153 may capture network data originating from numerous distributed network servers, whether they are physical hardware servers or virtual machines running in cloud 140. In cloud-based implementations, remote capture agents 151-153 will generally only have access to information that is communicated to and received from machines running in the cloud-based environment. This is because, in a cloud environment, there is generally no access to any of the physical network infrastructure, as cloud computing may utilize a "hosted services" delivery model where the physical network infrastructure is typically managed by a third party.

Embodiments further include the capability to separate the data capture technology into a standalone component that can be installed directly on client servers, which may be physical servers or virtual machines residing on a cloud-based network (e.g., cloud 140), and used to capture and generate events for all network traffic that is transmitted in and out of the client servers. This eliminates the need to deploy and connect physical hardware to network TAPS or SPAN ports, thus allowing users to configure and change their data capture configuration on-the-fly rather than in fixed formats.

In the illustrated embodiment, remote capture agents 152-153 are in communication with network servers 130 residing in cloud 140, and remote capture agent 151 is located in cloud 140. Cloud 140 may represent any number of public and private clouds, and is not limited to any particular cloud configuration. Network servers 130 residing in cloud 140 may be physical servers and/or virtual machines in cloud 140, and network traffic to and from network servers 130 may be monitored by remote capture agent 151 and/or other remote capture agents connected to network servers 130. Further, remote capture agents 152-153 may also run in cloud 140 on physical servers and/or virtual machines. Those skilled in the art will appreciate that any number of remote capture agents may be included inside or outside of cloud 140.

Remote capture agents 151-153 may analyze network packets received from the networks(s) to which remote capture agents 151-153 are connected to obtain network data from the network packets and generate a number of events from the network data. For example, each remote capture agent 151-153 may listen for network traffic on network interfaces available to the remote capture agent. Network packets transmitted to and/or from the network interfaces may be intercepted by the remote capture agent and analyzed, and relevant network data from the network packets may be used by the remote capture agent to create events related to the network data. Such events may be generated by aggregating network data from multiple network packets, or each event may be generated using the contents of only one network packet. A sequence of events from a remote capture agent may then be included in one or more event streams that are provided to other components of system 100.

Configuration servers 120, data storage servers 135, and/or other network components may receive event data (e.g., event streams) from remote capture agents 151-153 and further process the event data before the event data is stored by data storage servers 135. In the illustrated embodiment, configuration servers 120 may transmit event data to data storage servers 135 over a network 101 such as a local area network (LAN), wide area network (WAN), personal area network (PAN), virtual private network, intranet, mobile phone network (e.g., a cellular network), WiFi network, Ethernet network, and/or other type of network that enables communication among computing devices. The event data may be received over a network (e.g., network 101, network 190) at one or more event indexers (see FIG. 10) associated with data storage servers 135.

In addition, system 100 may include functionality to determine the types of network data collected and/or processed by each remote capture agent 151-153 to avoid data duplication at the indexers, data storage servers 135, and/or other components of system 100. For example, remote capture agents 152-153 may process network traffic from the same network. However, remote capture agent 152 may generate page view events from the network traffic, and remote capture agent 153 may generate request events (e.g., of HyperText Transfer Protocol (HTTP) requests and responses) from the network traffic.

In one or more embodiments, configuration servers 120 include configuration information that is used to configure the creation of events from network data on remote capture agents 151-153. In addition, such configuration may occur dynamically during event processing (e.g., at runtime). Conversely, because most conventional network capture technologies target specific end uses, they have been designed to operate in a fixed way and generally cannot be modified dynamically or easily to address different and changing business needs.

At least certain embodiments described herein are adapted to provide a distributed remote capture platform in which the times at which events are communicated to the configuration servers 120 and the fields to be included in the events are controlled by way of user-modifiable configuration rather than by "hard coding" fixed events with pre-determined fields for a given network capture mechanism. The remote configuration capability described herein also enables additional in-memory processing (e.g., filtering, transformation, normalization, aggregation, etc.) on events at the point of capture (e.g., remote capture agents 151-153) before the events are transmitted to other components of system 100.

Configuration information stored at each configuration server 120 may be created and/or updated manually at the configuration server and/or at a network element in communication with the configuration server. For example, a user may upload a configuration file containing configuration information for a remote capture agent to one or more configuration servers 120 for subsequent propagation to the remote capture agent. Alternatively, the user may use a GUI to provide the configuration information, as described in further detail below with respect to FIGS. 4A-4E. The configuration information may further be provided by one or more applications running on a separate server or network element, such as data storage servers 135.

Remote capture agents 151-153 may then use the configuration information to generate events from captured network packets. When changes in the configuration information at the configuration server are detected at the remote capture agents, logic in the remote capture agents may be automatically reconfigured in response. This means the remote capture agents may be configured dynamically to produce different events, transform the events, and/or communicate event streams to different components of system 100.

To detect changes in configuration information at configuration servers 120, remote capture agents 151-153 may poll configuration servers 120 at periodic intervals for updates to the configuration information. The updates may then be pulled from configuration servers 120 by remote capture agents 151-153. Conversely, updates to the configuration information may be pushed from configuration servers 120 to remote capture agents 151-153 at periodic intervals and/or when changes to the configuration information have been made.

In one embodiment, configuration servers 120 include a list of event streams generated by remote capture agents 151-153, as well as the configuration information used to generate the event streams at remote capture agents 151-153. The configuration information may include a unique identifier for each event stream, the types of events to be included in the event stream, one or more fields to be included in each event, and/or one or more filtering rules for filtering events to be included in the event stream. Using configuration information to dynamically modify network data capture by remote capture agents (e.g., remote capture agents 151-153) is described in a non-provisional application by inventor Michael Dickey, entitled "Distributed Processing of Network Data Using Remote Capture Agents," having Ser. No. 14/253,713, and filing date 15 Apr. 2014, issued as U.S. Pat. No. 10,127,273, which is incorporated herein by reference.

In one or more embodiments, system 100 includes functionality to perform protocol-based capture and analysis of network data using remote capture agents 151-153. First, remote capture agents 151-153 may be configured to generate event streams from packet flows captured at remote capture agents 151-153 based on protocol classifications for the packet flows, as described below with respect to FIGS. 2A-2B. Second, configuration servers 120 may include functionality to streamline the configuration of remote capture agents 151-153 in generating protocol-specific event streams, as described below with respect to FIGS. 3A-3B and 4A-4C. Third, configuration servers 120 and/or remote capture agents 151-153 may enable the use of capture triggers to capture additional network data based on the identification of potential security risks from previously generated event streams, as described below with respect to FIGS. 3A, 3C and 5A-5C.

Figure 2A:
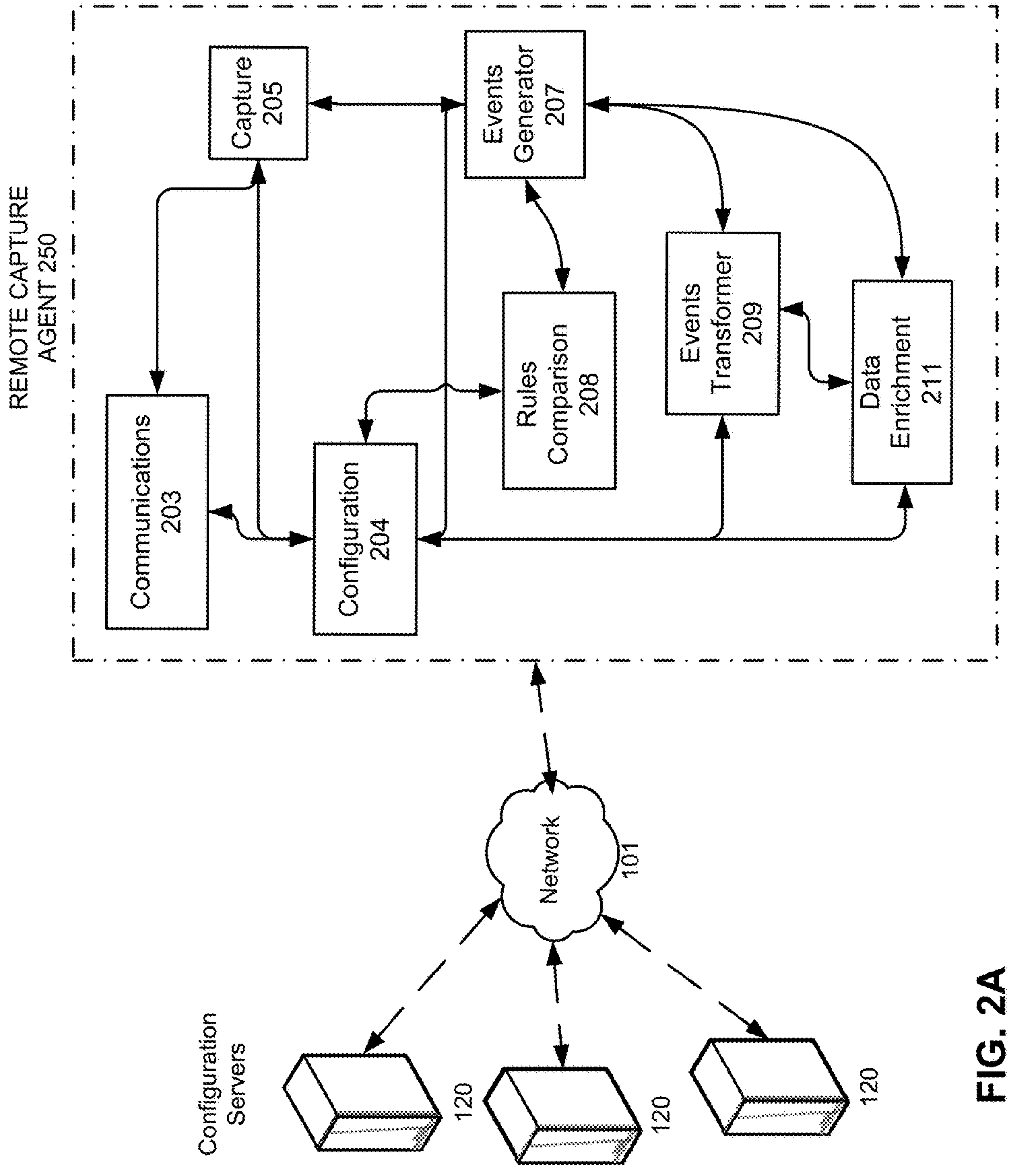
FIG. 2A shows a remote capture agent in accordance with the disclosed embodiments.

FIG. 2A shows a remote capture agent 250 in accordance with the disclosed embodiments. In the illustrated embodiment, remote capture agent 250 is adapted to receive configuration information from one or more configuration servers 120 over network 101. Remote capture agent 250 may be installed at a customer's premises on one or more of the customer's computing resources. Remote capture agent 250 may also be installed in a remote computing environment such as a cloud computing system. For example, remote capture agent 250 may be installed on a physical server and/or in a virtual computing environment (e.g., virtual machine) that is distributed across one or more physical machines.

Remote capture agent 250 includes a communications component 203 configured to communicate with network elements on one or more networks (e.g., network 101) and send and receive network data (e.g., network packets) over the network(s). As depicted, communications component 203 may communicate with configuration servers 120 over network 101. Communications component 203 may also communicate with one or more sources of network data, such as network servers 130 of FIG. 1.

Network data received at communications component 203 may be captured by a capture component 205 coupled with communications component 203. Capture component 205 may capture some or all network data from communications component 203. For example, capture component 205 may capture network data based on the sources and/or destinations of the network data, the types of network data, the protocol associated with the network data, and/or other characteristics of the network data.

In addition, the network data may be captured based on configuration information stored in a configuration component 204 of remote capture agent 250. As mentioned above, the configuration information may be received from configuration servers 120 over network 101. The configuration information may then be used to dynamically configure or reconfigure remote capture agent 250 in real-time. For example, newly received configuration information in configuration component 204 may be used to configure the operation of remote capture agent 250 during processing of events from network data by remote capture agent 250.

To dynamically configure remote capture agent 250, configuration information received by configuration component 204 from configuration servers 120 may be provided to other components of remote capture agent 250. More specifically, remote capture agent 250 includes an events generator 207 that receives network data from network data capture component 205 and generates events from the network data based on configuration information from configuration component 204.

Using configuration information provided by configuration servers 120, remote capture agent 250 can be instructed to perform any number of event-based processing operations. For example, the configuration information may specify the generation of event streams associated with network (e.g., HTTP, Simple Mail Transfer Protocol (SMTP), Domain Name System (DNS)) transactions, business transactions, errors, alerts, clickstream events, and/or other types of events. The configuration information may also describe custom fields to be included in the events, such as values associated with specific clickstream terms. The configuration information may include additional parameters related to the generation of event data, such as an interval between consecutive events and/or the inclusion of transactions and/or errors matching a given event in event data for the event. Configuration information for configuring the generation of event streams from network data captured by remote capture agents is further described in the above-referenced application.

An events transformer 209 may further use the configuration information to transform some or all of the network data from capture component 205 and/or events from events generator 207 into one or more sets of transformed events. In one or more embodiments, transformations performed by events transformer 209 include aggregating, filtering, cleaning, and/or otherwise processing events from events generator 207. Configuration information for the transformations may thus include a number of parameters that specify the types of transformations to be performed, the types of data on which the transformations are to be performed, and/or the formatting of the transformed data.

A rules comparison engine 208 in remote capture agent 250 may receive events from event generator 207 and compare one or more fields from the events to a set of filtering rules in the configuration information to determine whether to include the events in an event stream. For example, the configuration information may specify packet-level, protocol-level, and/or application-level filtering of event data from event streams generated by remote capture agent 250.

Finally, a data enrichment component 211 may further transform event data to a different form or format based on the configuration information from configuration component 204. For example, data enrichment component 211 may use the configuration information to normalize the data so that multiple representations of the same value (e.g., timestamps, measurements, etc.) are converted into the same value in transformed event data.

Data can be transformed by data enrichment component 211 in any number of ways. For example, remote capture agent 250 may reside on a client server in Cupertino, California, where all the laptops associated with the client server have been registered with the hostname of the client server. Remote capture agent 250 may use the registration data to look up an Internet Protocol (IP) address in a look-up table (LUT) that is associated with one or more network elements of the client server's local network. Remote capture agent 250 may then resolve a user's IP address into the name of the user's laptop, thereby enabling inclusion of the user's laptop name in transformed event data associated with the IP address. The transformed event data may then be communicated to configuration servers 120 and/or a central transformation server residing in San Francisco for further processing, indexing, and/or storage.

Figure 2B:
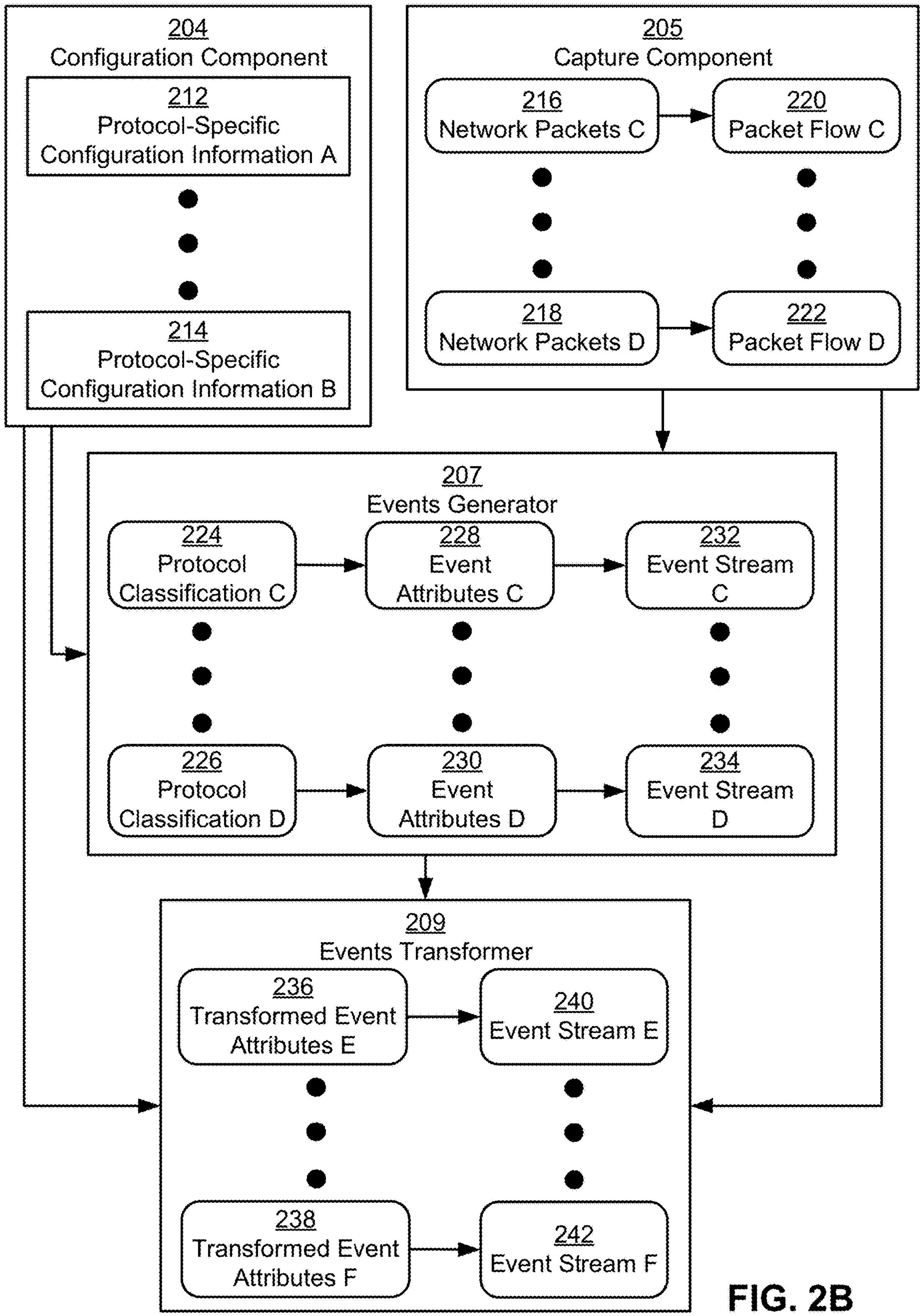
FIG. 2B shows the protocol-based capture of network data using a remote capture agent in accordance with the disclosed embodiments.

As mentioned above, remote capture agent 250 may perform protocol-based generation of event streams from network data. As shown in FIG. 2B, configuration component 204 may obtain protocol-specific configuration information (e.g., protocol-specific configuration information A 212, protocol-specific configuration information B 214) from one or more configuration servers (e.g., configuration servers 120). For example, configuration information from the configuration server(s) may be transmitted over network 101 to communications component 203, which provides the configuration information to configuration component 204 for storage and/or further processing.

Protocol-specific configuration information from configuration component 204 may be used to configure the generation of event streams (e.g., event stream C 232, event stream D 234, event stream E 240, event stream F 242) based on protocol classifications of network packets (e.g., network packets C 216, network packets D 218) captured by capture component 205. For example, protocol-specific configuration information from configuration component 204 may specify the creation of event streams from the network packets based on the protocols used in the network packets, such as HTTP, DNS, SMTP, File Transfer Protocol (FTP), Server Message Block (SMB), Network File System (NFS), Internet Control Message Protocol (ICMP), email protocols, database protocols, and/or security protocols. Such event streams may include event attributes that are of interest to the respective protocols.

Before the event streams are generated from the network packets, capture component 205 may assemble the network packets into one or more packets flows (e.g., packet flow C 220, packet flow D 222). First, capture component 205 may identify the network packets in a given packet flow based on control information in the network packets. The packet flow may represent a communication path between a source and a destination (e.g., host, multicast group, broadcast domain, etc.) on the network. As a result, capture component 205 may identify network packets in the packet flow by examining network (e.g., IP) addresses, ports, sources, destinations, and/or transport protocols (e.g., Transmission Control Protocol (TCP), User Datagram Protocol (UDP), etc.) from the headers of the network packets.

Next, capture component 205 may assemble the packet flow from the network packets. For example, capture component 205 may assemble a TCP packet flow by rearranging out-of-order TCP packets. Conversely, capture component 205 may omit reordering of the network packets in the packet flow if the network packets use UDP and/or another protocol that does not provide for ordered packet transmission.

After the packet flow is assembled, capture component 205 and/or another component of remote capture agent 250 may detect encryption of the network packets in the packet flow by analyzing the byte signatures of the network packets' payloads. For example, the component may analyze the network packets' payloads for byte signatures that are indicative of Secure Sockets Layer (SSL) and/or Transport Layer Security (TLS) encryption. If the network packets are detected as encrypted, the component may decrypt the network packets. For example, the component may have access to private keys from an SSL server used by the network flow and perform decryption of the network packets to obtain plaintext payload data in the order in which the data was sent. Such access to private keys may be given to remote capture agent 250 by an administrator associated with the network flow, such as an administrator of the host from which the network packets are transmitted.

Events generator 207 may then obtain a protocol classification (e.g., protocol classification C 224, protocol classification D 226) for each packet flow identified, assembled, and/or decrypted by capture component 205. For example, events generator 207 may use a protocol-decoding mechanism to analyze the headers and/or payloads of the network packets in the packet flow and return protocol identifiers of one or more protocols used in the network packets. The protocol-decoding mechanism may additionally provide metadata related to the protocols, such as metadata related to traffic volume, application usage, application performance, user and/or host identifiers, content (e.g., media, files, etc.), and/or file metadata (e.g., video codecs and bit rates).

Once the protocol classification is obtained for a packet flow, events generator 207 may use protocol-specific configuration information associated with the protocol classification from configuration component 204 to build an event stream (e.g., event stream C 232, event stream D 234) from the packet flow. As mentioned above and in the above-referenced application, the event stream may include time-series event data generated from network packets in the packet flow. To create the event stream, events generator 207 may obtain one or more event attributes associated with the protocol classification from the configuration information. Next, event generator 207 may extract the event attribute(s) from the network packets in the first packet flow. Events generator 207 may then include the extracted event attribute(s) in the event stream.

For example, events generator 207 may obtain a protocol classification of DNS for a packet flow from capture component 205 and protocol-specific configuration information for generating event streams from DNS traffic from configuration component 204. The protocol-specific configuration information may specify the collection of event attributes such as the number of bytes transferred between the source and destination, network addresses and/or identifiers for the source and destination, DNS message type, DNS query type, return message, response time to a DNS request, DNS transaction identifier, and/or a transport layer protocol. In turn, events generator 207 may parse the protocol-specific configuration to identify the event attributes to be captured from the packet flow. Next, events generator 207 may extract the specified event attributes from the network packets in the packet flow and/or metadata received with the protocol classification of the packet flow and generate time-stamped event data from the extracted event attributes. Events generator 207 may then provide the time-stamped event data in an event stream to communications component 203 for transmission of the event stream over a network to one or more configuration servers, data storage servers, indexers, and/or other components for subsequent storage and processing of the event stream by the component(s).

As described above and in the above-referenced application, network data from capture component 205 and/or event data from events generator 207 may be transformed by events transformer 209 into transformed event data that is provided in lieu of or in addition to event data generated by events generator 207. For example, events transformer 209 may aggregate, filter, clean, and/or otherwise process event attributes from events generator 207 to produce one or more sets of transformed event attributes (e.g., transformed event attributes 1 236, transformed event attributes z 238). Events transformer 209 may then include the transformed event attributes into one or more additional event streams (e.g., event stream 1 240, event stream z 242) that may be transmitted over the network for subsequent storage and processing of the event stream(s) by other components on the network. Such transformation of event data at remote capture agent 250 may offload subsequent processing of the event data at configuration servers and/or other components on the network. Moreover, if the transformation reduces the size of the event data (e.g., by aggregating the event data), network traffic between remote capture agent 250 and the other components may be reduced, along with the storage requirements associated with storing the event data at the other components.

As with protocol-based generation of event data by events generator 207, events transformer 209 may use protocol-specific configuration information from configuration component 204 to transform network and/or event data from a given packet flow and/or event stream. For example, events transformer 209 may obtain protocol-specific configuration information for aggregating HTTP events and use the configuration information to generate aggregated HTTP events from HTTP events produced by events generator 207. The configuration information may include one or more key attributes used to generate a unique key representing an aggregated event from the configuration information. For example, key attributes for generating an aggregated HTTP event may include the source and destination IP addresses and ports in a set of HTTP events. A different unique key and aggregated HTTP event may thus be generated for each unique combination of source and destination IP addresses and ports in the HTTP events.

The configuration information may also specify one or more aggregation attributes to be aggregated prior to inclusion in the aggregated event. For example, aggregation attributes for generating an aggregated HTTP event from HTTP event data may include the number of bytes and packets sent in each direction between the source and destination. Data represented by the aggregation attributes may be included in the aggregated HTTP event by summing, averaging, and/or calculating a summary statistic from the number of bytes and packets sent in each direction between the source and destination. Aggregation of event data is described in further detail below with respect to FIG. 4C.

Figure 3:
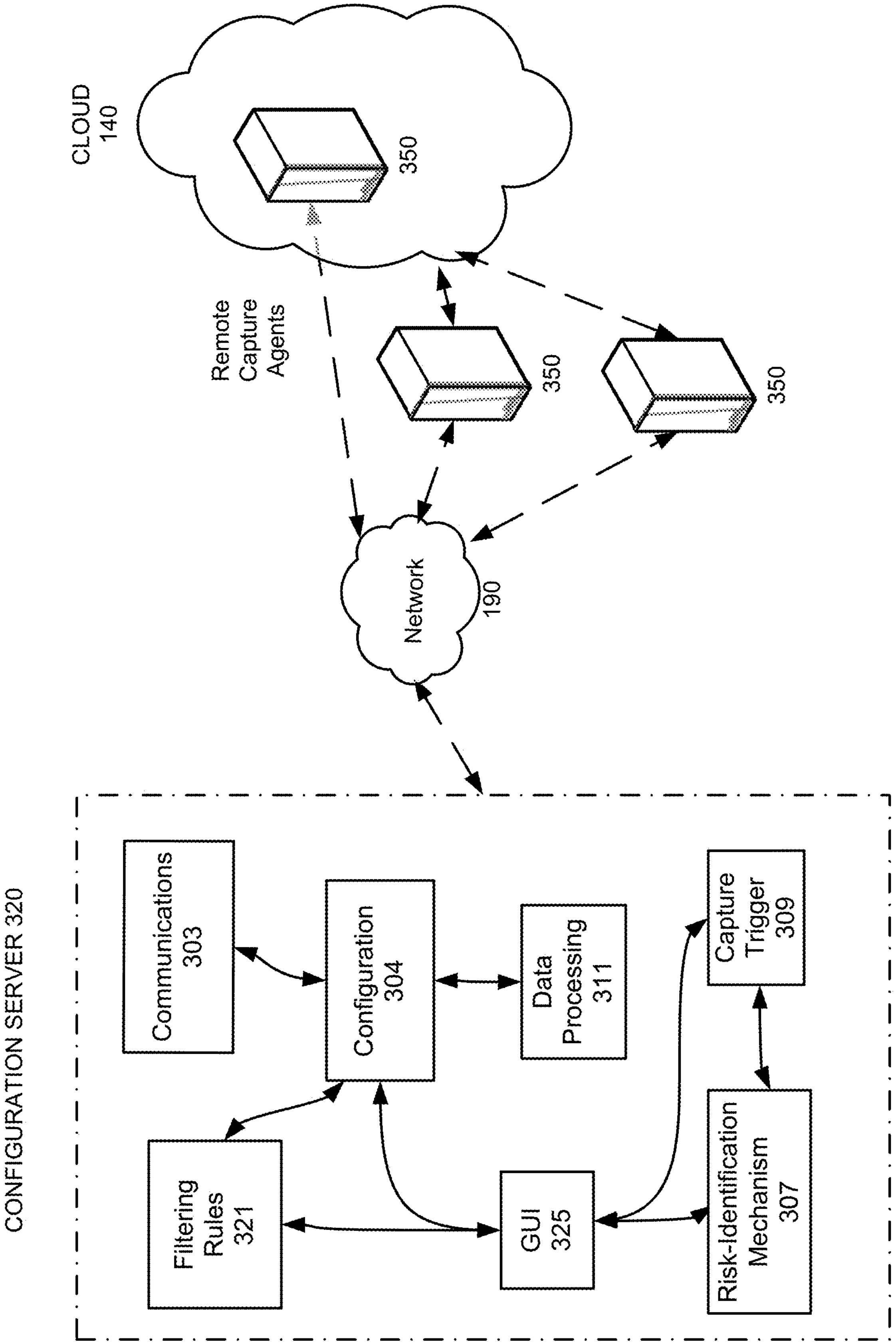
FIG. 3 shows a configuration server in accordance with the disclosed embodiments.

FIG. 3 shows a configuration server 320 in accordance with the disclosed embodiments. As shown in the illustrated embodiment, configuration server 320 is in communication with multiple remote capture agents 350 over network 190, and remote capture agents 350 are distributed throughout network 190 and cloud 140. Configuration server 320 includes a communications component 303 that receives events from remote capture agents 350 over networks 190 and/or 140. Communications component 303 may also communicate with one or more data storage servers, such as data storage servers 135 of FIG. 1.

Configuration server 320 also includes a configuration component 304 that stores configuration information for remote capture agents 350. As described above, the configuration information may specify the types of events to produce, data to be included in the events, and/or transformations to be applied to the data and/or events to produce transformed events. Some or all of the transformations may be specified in a set of filtering rules 321 that may be applied to event data at remote capture agents 350 to determine a subset of the event data to be included in one or more event streams that are sent to configuration server 320 and/or other components.

Configuration server 320 may also include a data processing component 311 that performs additional processing of the event streams based on configuration information from configuration component 304. As discussed in the above example with respect to FIG. 2, event data may be transformed at a remote capture agent (e.g., remote capture agent 250) during resolution of the user's IP address was into the name of the user's laptop. The transformed event data may be sent to configuration server 320 and/or a transformation server for additional processing and/or transformation, such as taking the host name from the transformed event data, using an additional LUT to obtain a user identifier (user ID) of the person to which the laptop is registered, and further transforming the event data by including the user ID in the event data before forwarding the event data to a third server (e.g., a transformation server) for another round of processing.

Configuration server 320 may also provide a GUI 325 that can be used to configure or reconfigure the information contained in configuration component 304. The operation of GUI 325 is discussed in further detail below with respect to FIGS. 4A-4E and 5A-5C.

Finally, configuration server 320 may provide a risk-identification mechanism 307 for identifying a security risk from time-series event data generated by remote capture agents 350, as well as a capture trigger 309 for generating additional time-series event data based on the security risk. For example, risk-identification mechanism 307 may allow a user to view and/or search for events that may represent security risks through GUI 325. Risk-identification mechanism 307 and/or GUI 325 may also allow the user to set and/or activate capture trigger 309 based on the events shown and/or found through risk-identification mechanism 307 and/or GUI 325.

In particular, risk-identification mechanism 307 and/or GUI 325 may allow the user to manually activate capture trigger 309 after discovering a potential security risk. In turn, the activated capture trigger 309 may modify configuration information in configuration component 304 that is propagated to remote capture agents 350 to trigger the capture of additional network data by remote capture agents 350.

Alternatively, risk-identification mechanism 307 may allow the user to create a search and/or recurring search for time-series event data that may match a security risk. If the search and/or recurring search finds time-series event data that matches the security risk, capture trigger 309 may automatically be activated to enable the generation of additional time-series event data, such as event data containing one or more attributes associated with one or more protocols that facilitate analysis of the security risk. Such automatic activation of capture trigger 309 may allow the additional event data to be generated immediately after a notable event is detected, thus averting the loss of captured network data that results from enabling additional network data capture only after a potential security risk is manually identified (e.g., by an analyst). Triggering the generation of additional time-series event data from network packets on remote agents based on potential security risks is described in further detail below with respect to FIGS. 5A-5C.

FIG. 4A shows an exemplary screenshot in accordance with the disclosed embodiments. More specifically, FIG. 4A shows a screenshot of a GUI, such as GUI 325 of FIG. 3. As described above, the GUI may be used to obtain configuration information that is used to configure the generation of event streams containing time-series event data at one or more remote capture agents distributed across a network.

As shown in FIG. 4A, the GUI includes a table with a set of columns 402-408 containing high-level information related to event streams that may be created using the configuration information. Each row of the table may represent an event stream, and rows of the table may be sorted by column 402.

Column 402 shows an alphabetized list of names of the event streams, and column 404 provides descriptions of the event streams. For example, columns 402-404 may include names and descriptions of event streams generated from HTTP, Dynamic Host Configuration Protocol (DHCP), DNS, FTP, email protocols, database protocols, NFS, Secure Message Block (SMB), security protocols, Session Initiation Protocol (SIP), TCP, and/or UDP network traffic. Columns 402-404 may thus indicate that event streams may be generated based on transport layer protocols, session layer protocols, presentation layer protocols, and/or application layer protocols.

A user may select a name of an event stream under column 402 to access and/or update configuration information for configuring the generation of the event stream. For example, the user may select "DemoHTTP" in column 402 to navigate to a screen of the GUI that allows the user to specify event attributes, filters, and/or aggregation information related to creating the "DemoHTTP" event stream, as discussed in further detail below with respect to FIGS. 4B-4E.

Column 406 specifies whether each event stream is enabled or disabled. For example, column 406 may indicate that the "AggregateHTTP," "DemoHTTP," "dns," "ftp," "mysql-query," "sip," "tcp," and "udp" event streams are enabled. If an event stream is enabled, time-series event data may be included in the event stream based on the configuration information for the event stream.

Column 408 specifies whether each event stream is cloned from an existing event stream. For example, column 408 may indicate that the "AggregateHTTP" and "DemoHTTP" event streams have been cloned (e.g., copied) from other event streams, while the remaining event streams may be predefined with default event attributes.

The GUI also includes a user-interface element 410 (e.g., "Clone Stream"). A user may select user-interface element 410 to create a new event stream as a copy of an event stream listed in the GUI. After user-interface element 410 is selected, an overlay may be displayed that allows the user to specify a name for the new event stream, a description of the new event stream, and an existing event stream from which the new event stream is to be cloned. The new event stream may then be created with the same event attributes and/or configuration options as the existing event stream, and the user may use the GUI to customize the new event stream as a variant of the existing event stream (e.g., by adding or removing event attributes, filters, and/or aggregation information).

FIG. 4B shows an exemplary screenshot in accordance with the disclosed embodiments. More specifically, FIG. 4B shows a screenshot of the GUI of FIG. 4A after the user has selected "DemoHTTP" from column 402. In response to the selection, the GUI displays configuration information and/or configuration options for the "DemoHTTP" event stream.

Like the GUI of FIG. 4A, the GUI of FIG. 4B may include a table. Each row in the table may represent an event attribute that is eligible for inclusion in the event stream. For example, an event attribute may be included in the table if the event attribute can be obtained from network packets that include the protocol of the event stream. Columns 412-420 of the table may allow the user to use the event attributes to generate time-series event data that is included the event stream. First, column 412 includes a series of checkboxes that allows the user to include individual event attributes in the event stream or exclude the event attributes from the event stream. If a checkbox is checked, the corresponding event attribute is added to the event stream, and the row representing the event attribute is shown with other included event attributes in an alphabetized list at the top of the table. If a checkbox is not checked, the corresponding event attribute is omitted from the event stream, and the row representing the event attribute is shown with other excluded event attributes in an alphabetized list following the list of included event attributes. Those skilled in the art will appreciate that the GUI may utilize other sortings and/or rankings of event attributes in columns 412-420.

Columns 414-418 may provide information related to the event attributes. Column 414 may show the names of the event attributes, column 416 may provide a description of each event attribute, and column 418 may provide a term representing the event attribute. In other words, columns 414-418 may allow the user to identify the event attributes and decide whether the event attributes should be included in the event stream.

Column 420 may include a series of links labeled "Add." The user may select one of the links to access a portion of the GUI that allows the user to set a filter for the corresponding event attribute. The filter may then be used in the generation of the event stream from network data. Creation of filters for generating event streams from network packets is described in further detail below with respect to FIGS. 4D-4E.

The GUI of FIG. 4B also includes information 422 related to the event stream. For example, information 422 may include the name (e.g., "DemoHTTP") of the event stream, the protocol classification and/or type (e.g., "http.event") of the event stream, and the number of filters (e.g., "0 filters configured") set for the event stream. Information 422 may also include a checkbox 436 that identifies if the event stream contains aggregated event data. If checkbox 436 is checked, the GUI may be updated with options associated with configuring the generation of an aggregated event stream, as described below with respect to FIG. 4C.

Finally, the GUI of FIG. 4B includes a set of user-interface elements 424-434 for managing the event stream. First, the user may select user-interface element 424 (e.g., "Enabled") to enable generation of the event stream from network data and user-interface element 426 (e.g., "Disabled") to disable the generation of the event stream from the network data.

Next, the user may select user-interface element 428 (e.g., "Clone") to clone the event stream and user-interface element 430 (e.g., "Delete") to delete the event stream. If the user selects user-interface element 428, the GUI may obtain a name and description for the cloned event stream from the user. Next, the GUI may copy the content of columns 412-420, including configuration options (e.g., checkboxes in column 412 and filters added using links in column 420) that have been changed but not yet saved by the user, to a new screen for configuring the generation of the cloned event stream.

If the user selects user-interface element 430, the GUI may remove the event stream from the table in FIG. 4A. In turn, a representation of the event stream may be removed from the configuration information to stop the generation of time-series event data in the event stream by one or more remote capture agents.

The user may select user-interface element 432 (e.g., "Cancel") to discharge changes to the configuration information made in the current screen of the GUI. Conversely, the user may select user-interface 434 (e.g., "Save") to propagate the changes to the configuration information, and in turn, update the generation of event data from network packets captured by the remote capture agents based on the changes.

FIG. 4C shows an exemplary screenshot in accordance with the disclosed embodiments. In particular, FIG. 4C shows a screenshot of the GUI of FIG. 4B after checkbox 436 has been checked. Because checkbox 436 is checked, the GUI includes a number of user-interface elements for configuring the generation of an aggregated event stream. The aggregated event stream may include aggregated event data, which in turn may be generated by aggregating and/or extracting event attributes from one or more network packets in a packet flow. For example, an HTTP event may be generated from one to several HTTP packets representing an HTTP request/response pair. Event attributes from multiple HTTP events may then be aggregated into a single aggregated HTTP event to reduce the amount of event data generated from the network data without losing important attributes of the event data.

As shown in FIG. 4C, a new column 438 is added to the table. Each row in column 438 may include a pair of user-interface elements (e.g., buttons) that allow the user to identify the corresponding event attribute as a key attribute or an aggregation attribute. One or more key attributes may be used to generate a unique key representing each aggregated event, and one or more aggregation attributes may be aggregated prior to inclusion in the aggregated event. Some event attributes (e.g., "dest_ip," "src_ip," "uri_path") may only be used as key attributes because the event attributes are not numeric in nature. On the other hand, event attributes that may be summed (e.g., "dest_port," "status," "bytes," "bytes_in," "bytes_out," "time_taken") may have numeric values.

Event attributes identified as key attributes in column 438 may be sorted at the top of the table, followed by event attributes identified as aggregation attributes. Event attributes that are not included in the event stream (e.g., event attributes with unchecked checkboxes in column 412) may be shown below the aggregation attributes in the table. Alternatively, event attributes may be displayed in the table according to other sortings and/or rankings.

While sums are the only type of aggregation shown in the GUI of FIG. 4C, other types of aggregation may also be used to generate aggregated event data. For example, aggregated event streams may be created using minimums, maximums, averages, standard deviations, and/or other summary statistics of event attributes.

The GUI of FIG. 4C also includes a user-interface element 440 (e.g., a text box) for obtaining an aggregation interval over which event attributes are to be aggregated into a single aggregated event. The aggregation interval may be increased to increase the amount of aggregation in the aggregated event stream and reduced to decrease the amount of aggregation in the aggregated event stream.

For example, column 438 may indicate that the "dest_ip," "dest_port," "src_ip," "status," and "uri_path" event attributes are specified as key attributes and the "bytes," "bytes_in," "bytes_out," and "time_taken" event attributes are specified as aggregation attributes. Similarly, an aggregation interval of 60 seconds may be obtained from user-interface element 440. As a result, the aggregated event stream may include aggregated events generated from event data over a 60-second interval. After each 60-second interval has passed, a separate aggregated event with a unique key may be generated for each unique combination of "dest_ip," "dest_port," "src_ip," "status," and "uri_path" key attributes encountered during the interval. Values of "bytes," "bytes_in," "bytes_out," and "time_taken" for events within the interval that match the unique combination of key attributes may also be summed and/or otherwise aggregated into the aggregated event. Aggregated events generated from the configuration options may then be shown in the same GUI, as described in further detail below with respect to FIG. 4F.

Such configuration of event streams and/or aggregated event streams may allow network data to be captured at different levels of granularity and/or for different purposes. For example, an aggregated event stream may include all possible event attributes for the event stream to enable overall monitoring of network traffic. On the other hand, one or more unaggregated event streams may be created to capture specific types of network data at higher granularities than the aggregated event stream. In addition, multiple event streams may be created from the same packet flow and/or event data to provide multiple "views" of the packet flow and/or event data.

Figure 4D:
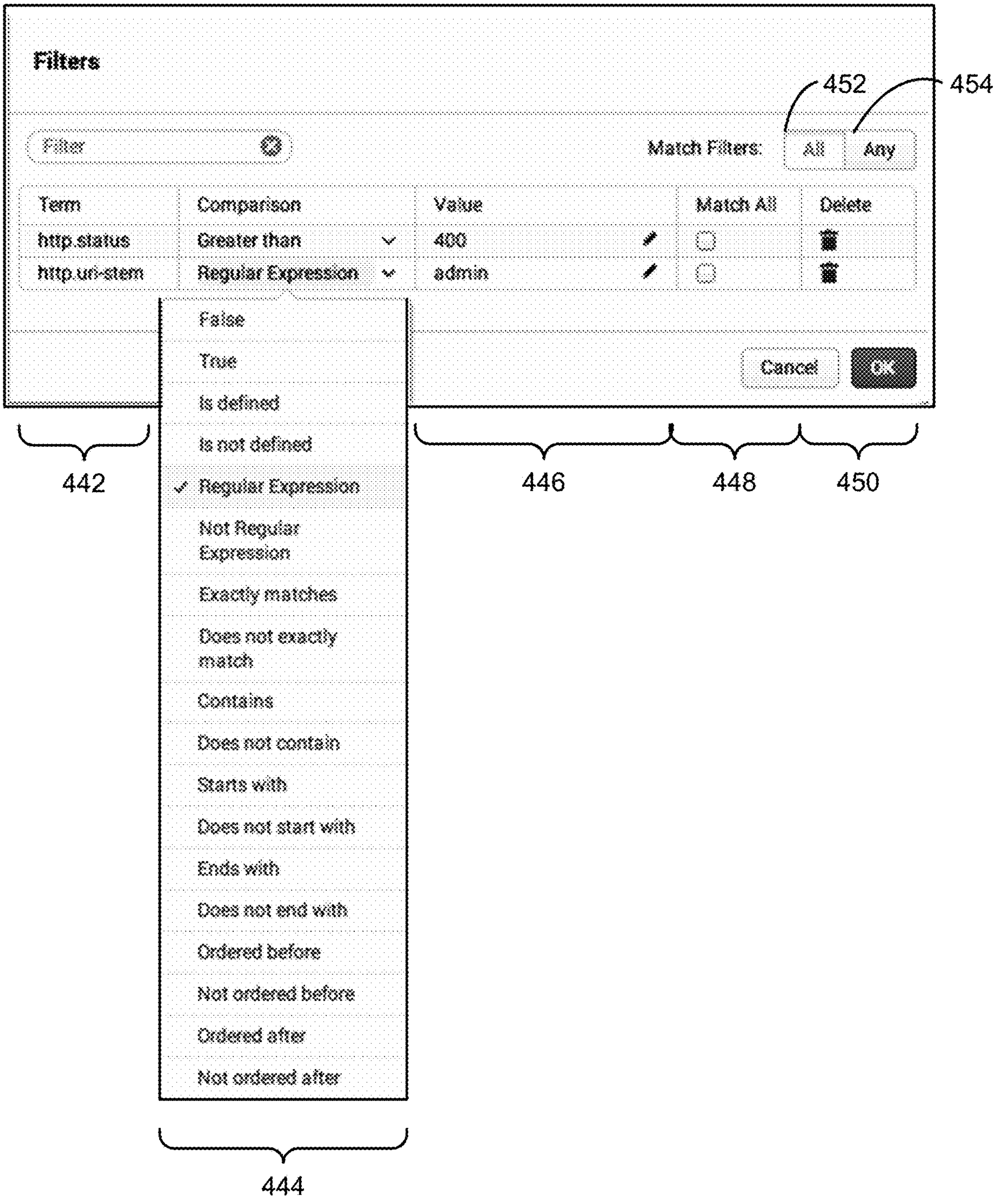
FIG. 4D shows an exemplary screenshot in accordance with the disclosed embodiments.

FIG. 4D shows an exemplary screenshot in accordance with the disclosed embodiments. More specifically, FIG. 4D shows a screenshot of the GUI of FIGS. 4B-4C after an "Add" link in column 420 is selected. For example, the GUI of FIG. 4D may be shown as an overlay on the screens of FIGS. 4B-4C to enable the addition of filters to configuration information for the event stream(s) and/or aggregated event stream(s) shown on the screens.

As with the screenshots of FIGS. 4A-4C, the GUI of FIG. 4D includes information and/or user-interface elements organized into a table. Rows of the table may represent filters for an event stream and/or aggregated event stream, and columns 442-450 of the table may facilitate identification and/or configuration of the filters.

First, column 442 may provide a list of terms representing event attributes to which the filters are to be applied. For example, column 422 may specify an "http.status" term representing the "status" event attribute and an "http.uri-stem" term representing the "uri_path" event attribute.

Column 444 may be used to provide a comparison associated with each filter. For example, a user may select a cell under column 444 to access a drop-down menu of possible comparisons for the corresponding filter. As shown in FIG. 4D, the second cell of column 444 is selected to reveal a drop-down menu of comparisons for a string-based event attribute (e.g., "uri_path"). Within the drop-down menu, "Regular Expression" is selected, while other options for the comparison may include "False," "True," "Is defined," "Is not defined," "Not Regular Expression," "Exactly matches," "Does not exactly match," "Contains," "Does not contain," "Starts with," "Does not start with," "Ends with," "Does not end with," "Ordered before," "Not ordered before," "Ordered after," and "Not ordered after." As a result, a number of comparisons may be made with string-based event attributes during filtering of network data by the string-based event attributes.

Column 446 may allow the user to specify a value against which the comparison in column 444 is made. Cells in column 446 may be text-editable fields and/or other user-interface elements that accept user input. For example, the second cell of column 446 may include a value of "admin" that is entered by the user. Consequently, the values in the second cells of columns 444-446 may be used to generate a filter that determines if the "uri_path" event attribute from network data matches a regular expression of "admin." If the network data matches the regular expression, the network data may be used to generate event data, which may subsequently be used to generate aggregated event data. If the network data does not match the regular expression, generation of event data from the network data may be omitted.

Column 448 may include a set of checkboxes with a "Match All" header. The user may check a checkbox in column 448 to require each value in a multi-value event attribute to match the filter. For example, the user may check a checkbox in column 448 for a filter that is applied to a checksum event attribute to ensure that each of multiple checksums in a given network packet and/or event satisfies the comparison in the filter.

Column 450 may allow the user to delete filters from the configuration information. For example, the user may select a user-interface (e.g., an icon) in a cell of column 450 to remove the corresponding filter from the configuration information.

The GUI also includes a set of user-interface elements 452-454 for determining the applicability of individual filters or all filters to the network data. For example, the user may select user-interface element 452 (e.g., "All") to apply the filters so that only data that matches all filters in the table is used to generate events. Conversely, the user may select user-interface element 454 (e.g., "Any") to apply the filters so that data matching any of the filters in the data is used to generate events. In other words, user-interface element 452 may be selected to apply a logical conjunction to the filters, while user-interface element 454 may be selected to apply a logical disjunction to the filters.

Figure 4E:
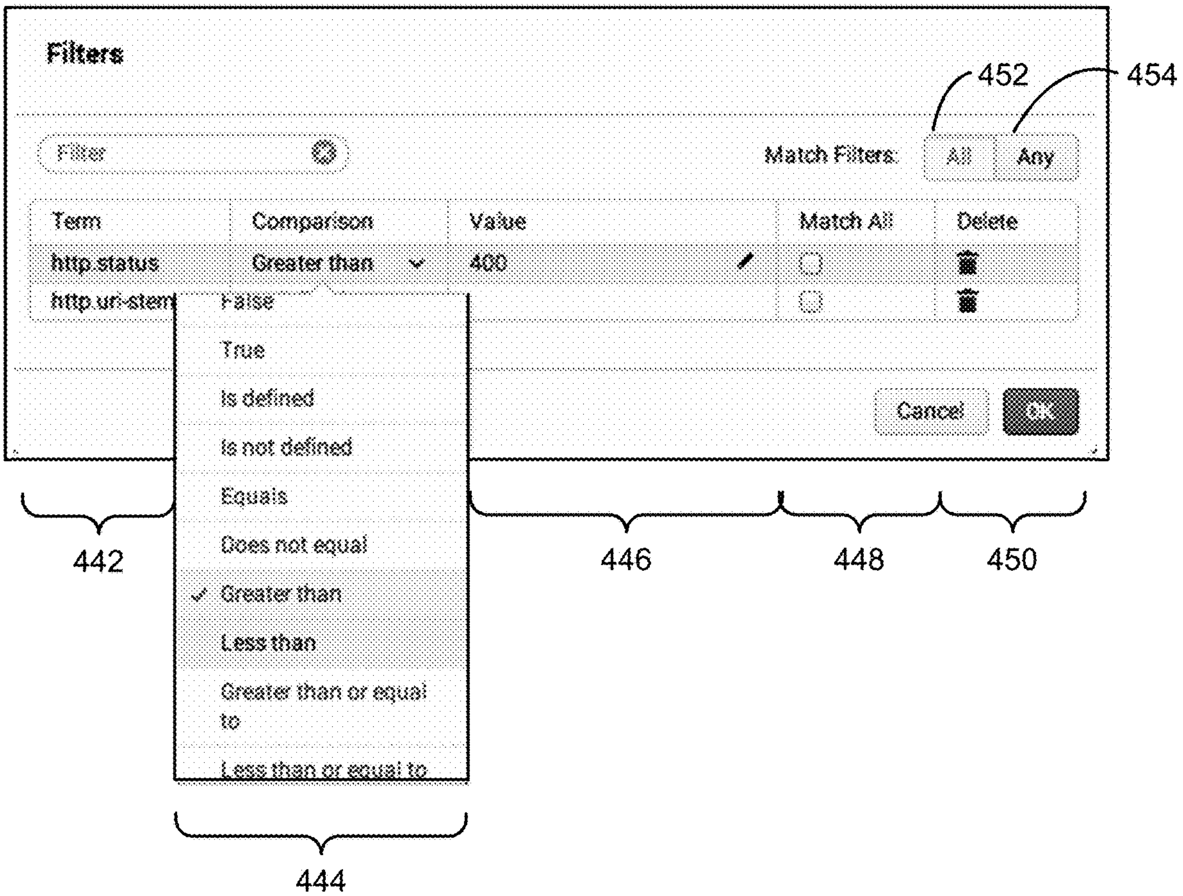
FIG. 4E shows an exemplary screenshot in accordance with the disclosed embodiments.

FIG. 4E shows an exemplary screenshot in accordance with the disclosed embodiments. As with the screenshot of FIG. 4D, FIG. 4E shows a GUI for adding and/or managing filters for generating event data at one or more remote capture components.

Within the GUI of FIG. 4E, the first cell of column 444 is selected. In turn, a drop-down menu of possible comparisons is shown for the corresponding filter. Because the filter relates to a numeric event attribute (e.g., an HTTP status code), comparisons in column 444 may be numeric in nature. For example, the "Greater than" comparison is selected, while other possible comparisons may include "False," "True," "Is defined," "Is not defined," "Equals," "Does not equal," "Less than," "Greater than or equal to," and "Less than or equal to." The differences in comparisons shown in FIG. 4E and FIG. 4D may ensure that comparisons that are meaningful and/or relevant to the types of event attributes specified in the filters are used with the filters.

FIG. 4F shows an exemplary screenshot in accordance with the disclosed embodiments. More specifically, FIG. 4F shows a screenshot of a GUI, such as GUI 325 of FIG. 3. The GUI of FIG. 4F may provide information related to aggregated events, such as aggregated events generated using the GUI of FIG. 4C.

As shown in FIG. 4F, a first column 456 contains a timestamp of an aggregated event, and a second column 458 shows the aggregated event. Within column 458, the aggregated event includes a number of event attributes. Some of the event attributes (e.g., "dest_ip," "dest_port," "src_ip," "status," "uri_path") are key attributes that are used to uniquely identify the aggregated event, and other event attributes (e.g., "dest_port," "status," "bytes," "bytes_in," "bytes_out," "time_taken") may be numerically summed before the event attributes are included in the aggregated event.

Figure 5A:
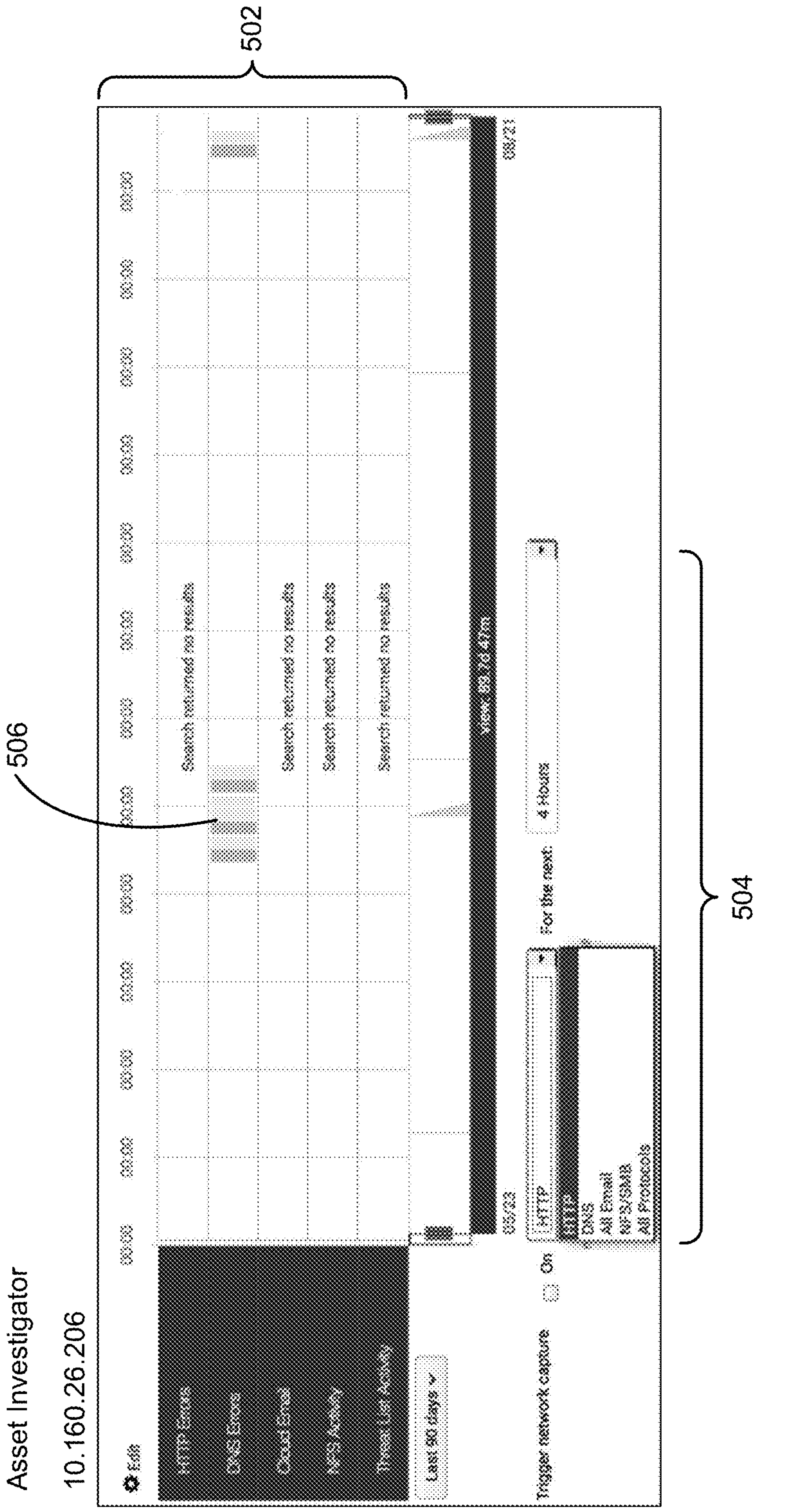
FIG. 5A shows an exemplary screenshot in accordance with the disclosed embodiments.

FIG. 5A shows an exemplary screenshot in accordance with the disclosed embodiments. More specifically, FIG. 5A shows a screenshot of a GUI, such as GUI 325 of FIG. 3. The GUI may be used with a risk-identification mechanism and/or a capture trigger, such as risk-identification mechanism 307 and capture trigger 309 of FIG. 3.

The GUI of FIG. 5A may include a portion 502 that represents the risk-identification mechanism. For example, portion 502 may display a dashboard of time-series event data that represents security risks. The dashboard includes a number of potential security risks, such as "HTTP Errors," "DNS Errors," "Cloud Email," "NFS Activity," and "Threat List Activity." Events that match one of the listed potential security risks may be represented as bars within a time interval represented by the horizontal dimension of the dashboard. For example, a security risk 506 may be shown as a series of bars clustered around an interval of time under "DNS Errors" in portion 502.

On the other hand, the dashboard may lack data for other potential security risks because the data volume associated with capturing network data across all protocols and/or security risks may be too large to effectively store and/or consume. As a result, portion 502 may indicate that no data is available (e.g., "Search returned no results") for the "HTTP Errors," "Cloud Email," "NFS Activity," and "Threat List Activity" security risks.

The GUI may also include a portion 504 that represents a capture trigger for generating additional time-series event data based on identified security risks from portion 502. For example, portion 504 may include a checkbox that allows a user to activate the capture trigger upon identifying security risk 506 in portion 502. Portion 504 may also include a first drop-down menu that allows the user to specify one or more protocols (e.g., "HTTP," "DNS," "All Email," "NFS/SMB," "All Protocols") of additional time-series event data to be captured with the capture trigger. Portion 504 may additionally include a second drop-down menu that allows the user to specify a period (e.g., "4 Hours") over which the additional time-series event data is to be captured after the capture trigger is activated.

After the capture trigger is activated, configuration information on one or more remote capture agents used to generate the time-series event data may be updated to include the additional protocol(s) specified in portion 504. For example, configuration information for configuring the generation of additional event streams from the specified protocol(s) may be propagated to the remote capture agents, and the remote capture agents may use the configuration to create the event streams from network data and/or event data at the remote capture agents. The configuration information may include default event attributes for the protocol(s) and/or event attributes that may be of interest to the security assessment of network packet flows. For example, the configuration information may specify the generation of event data related to other security risks, such as the security risks shown in the dashboard. Once the event data is generated and/or indexed, the event data may be shown in the dashboard to facilitate verification, monitoring, and/or analysis of the security risk. After the pre-specified period obtained from portion 504 has passed, the configuration information on the remote capture agents may be updated to disable the generation of the additional event streams and reduce the volume of network data captured by the remote capture agents.

As with the user interfaces of FIGS. 4A-4E, the user may add one or more filters that are applied during the generation of the additional time-series event data. For example, the user may use the user interfaces of FIGS. 4D-4E to add a filter for network and/or event data that exactly matches the IP address (e.g., 10.160.26.206) from which the security risk was detected. As a result, the additional time-series data may be generated only from network data containing the same source IP address. The user may also use the user interfaces of FIGS. 4A-4C to customize the collection of additional time-series event data by protocol and/or event attributes.

Figure 5B:
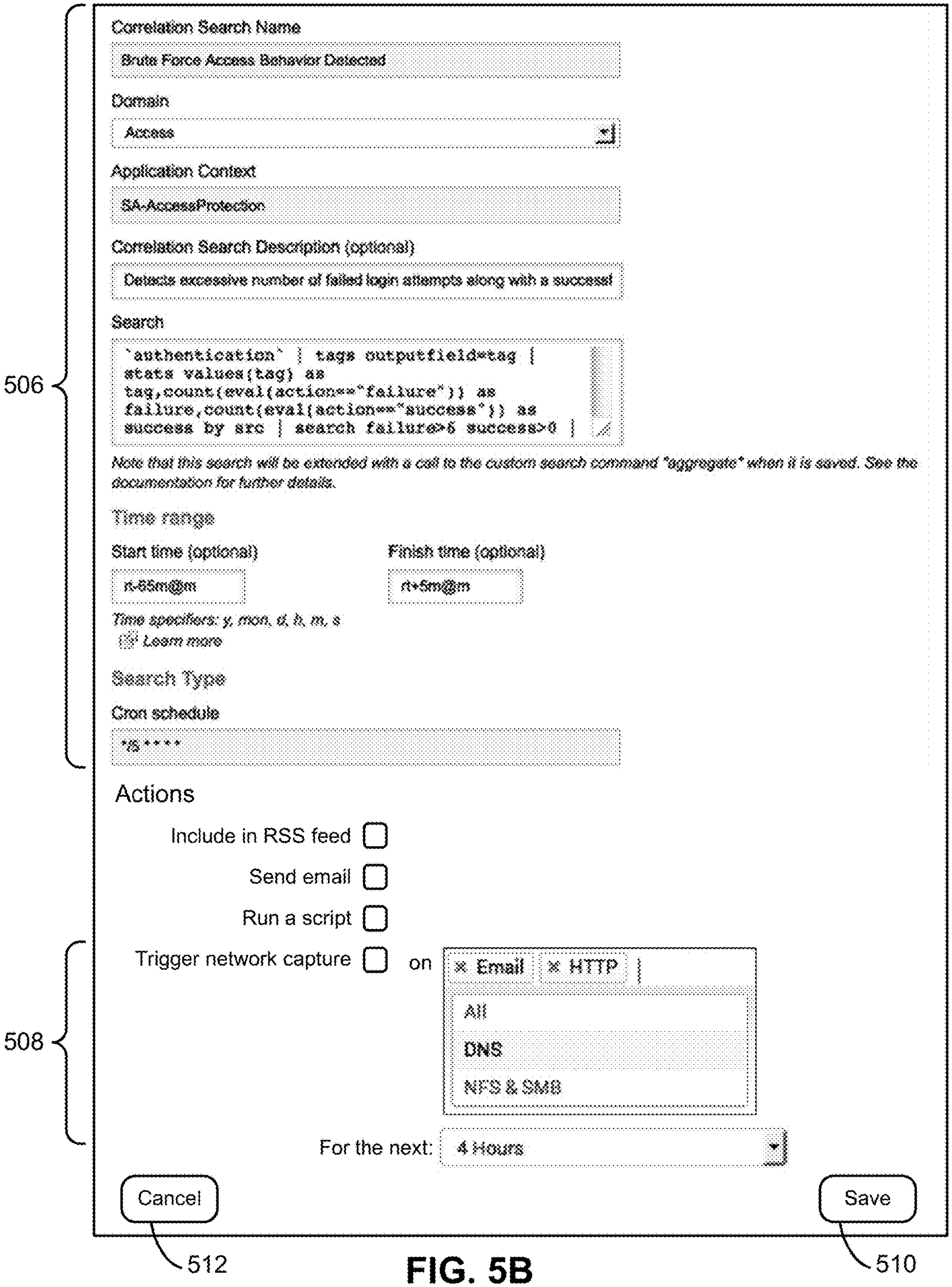
FIG. 5B shows an exemplary screenshot in accordance with the disclosed embodiments.

FIG. 5B shows an exemplary screenshot in accordance with the disclosed embodiments. In particular, FIG. 5B shows a screenshot of a GUI, such as GUI 325 of FIG. 3. Like the GUI of FIG. 5A, the GUI of FIG. 5B includes a first portion 506 representing a risk-identification mechanism and a second portion 508 representing a capture trigger.

Portion 506 may allow a user to create a recurring search for time-series event data that matches a security risk. For example, portion 506 may include user-interface elements for obtaining a domain, application context, description, search terms, time range (e.g., start and end times), and/or frequency (e.g., daily, hourly, every five minutes, etc.) for the recurring search. The user may use the user-interface elements of portion 506 to specify a recurring search for an excessive number of failed login attempts in captured network and/or event data, which may represent brute force access behavior that constitutes a security risk.

Portion 508 may allow the user to provide the capture trigger, which is automatically activated if the recurring search finds time-series event data that matches the security risk. As with portion 504 of FIG. 5A, portion 508 may allow the user to set the capture trigger, specify one or more protocols to be captured with the capture trigger, and/or a pre-specified period over which network data using the protocol(s) is to be captured.

After the user has finished defining the recurring search and capture trigger, the user may select a user-interface 510 (e.g., "Save") to save the recurring search and capture trigger. The capture trigger may then be activated without additional input from the user once an iteration of the recurring search identifies the security risk. Conversely, the user may select a user-interface element 512 (e.g., "Cancel") to exit the screen of FIG. 5B without creating the recurring search and/or capture trigger.

Figure 6:
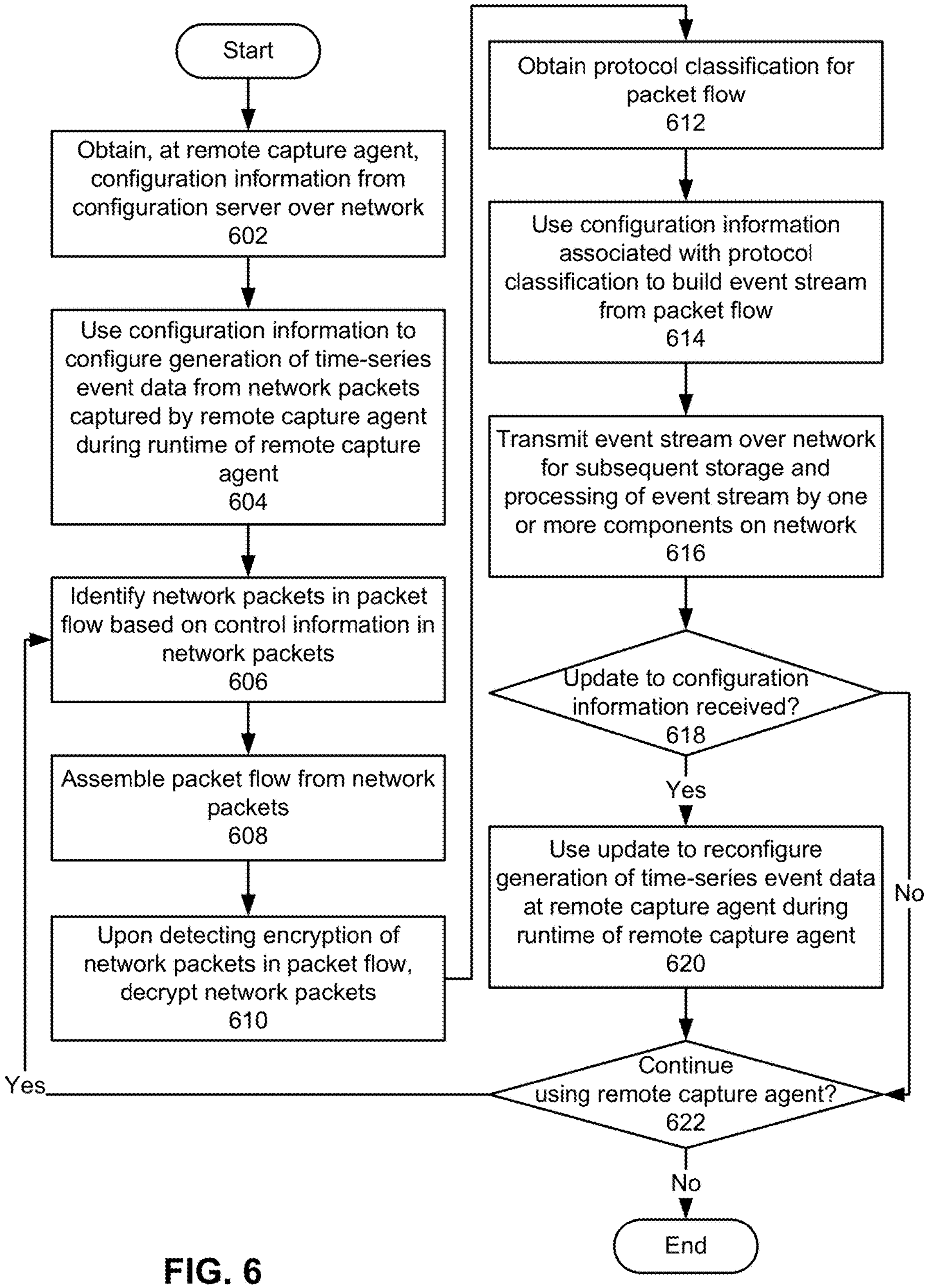
FIG. 6 shows a flowchart illustrating the processing of network data in accordance with the disclosed embodiments.

FIG. 6 shows a flowchart illustrating the processing of network data in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, configuration information is obtained at a remote capture agent from a configuration server over a network (operation 602). The remote capture agent may be located on a separate network from that of the configuration server. For example, the remote capture agent may be installed on a physical and/or virtual machine on a remote network and/or cloud. As discussed above, the remote capture agent and other remote capture agents may be used to capture network data from a set of remote networks in a distributed manner.

Next, the configuration information is used to configure the generation of event data from network packets captured by the remote capture agent during the runtime of the remote capture agent (operation 604). For example, the configuration information may be used to configure the remote capture agent to identify certain types of network packets, extract network data from the network packets, and/or include the network data in the event data.

The remote capture agent may identify network packets in a packet flow based on control information in the network packets (operation 608). For example, network packets between a source and destination may be identified based on source and/or destination network addresses, source and/or destination ports, and/or transport layer protocols in the headers of the network packets.

The remote capture agent may also assemble the packet flow from the network packets (operation 608) and/or decrypt the network packets upon detecting encryption of the network packets (operation 610). For example, the remote capture agent may rearrange out-of-order TCP packets into a TCP stream. The remote capture agent may also analyze the byte signatures of the network packets' payloads to identify encryption of the network packets and use an available private key to decrypt the network packets.

After the packet flow is identified, assembled and/or decrypted, the remote capture agent may obtain a protocol classification for the packet flow (operation 612). For example, the remote capture agent may provide network packets in the packet flow to a protocol-decoding mechanism and receive one or more protocol identifiers representing the protocols used by the network packets from the protocol-decoding mechanism.

Next, the remote capture agent may use configuration information associated with the protocol classification to build an event stream from the packet flow (operation 614), as described in further detail below with respect to FIG. 7. The remote capture agent may then transmit the event stream over a network for subsequent storage and processing of the event stream by one or more components on the network (operation 616). For example, the remote capture agent may transmit the event stream to one or more data storage servers, configuration servers, and/or indexers on the network.

An update to the configuration information may be received (operation 616). For example, the remote capture agent may receive an update to the configuration information after the configuration information is modified at a configuration server. If an update to the configuration information is received, the update is used to reconfigure the generation of time-series event data at the remote capture agent during runtime of the remote capture agent (operation 620). For example, the remote capture agent may be use the updated configuration information to generate one or more new event streams, discontinue the generation of one or more existing event streams, and/or modify the generation of one or more existing event streams.

The remote capture agent may continue to be used (operation 622) to capture network data. If the remote capture agent is to be used, packet flows captured by the remote capture agent are identified (operation 606), and network packets in the packet flows are assembled into the packet flows and/or decrypted (operations 608=610). Protocol classifications for the packet flows are also obtained and used, along with configuration information associated with the protocol classifications, to build event streams from the packet flows (operations 612-614). The event streams are then transmitted over the network (Operation 616), and any updates to the configuration information are used to reconfigure the operation of the remote capture agent (operations 618-620) during generation of the event streams. Capture of network data by the remote capture agent may continue until the remote capture agent is no longer used to generate event data from network data.

Figure 7:
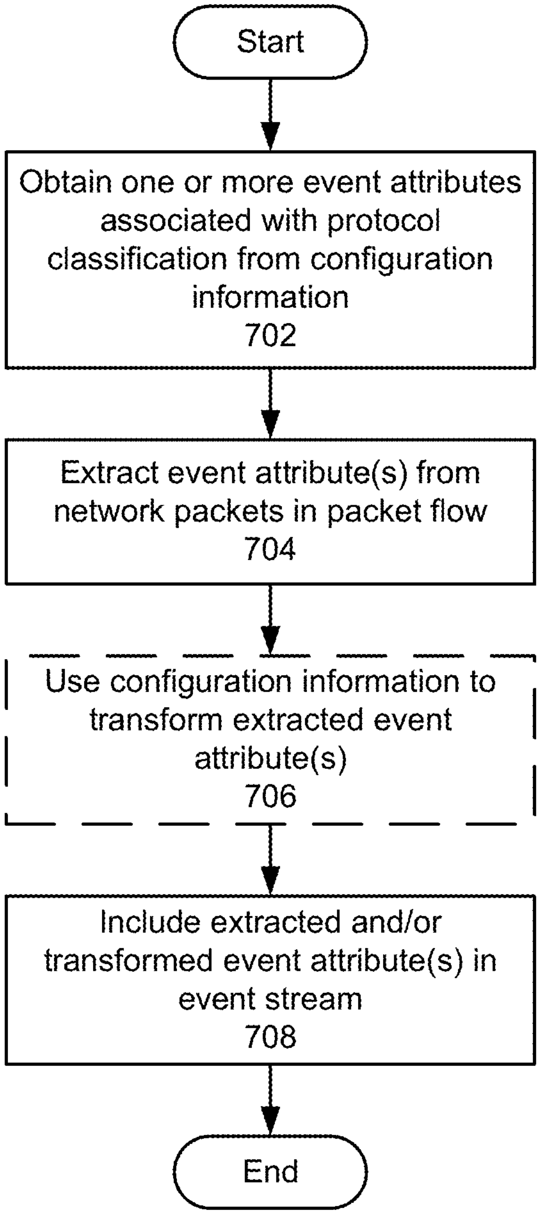
FIG. 7 shows a flowchart illustrating the process of using configuration information associated with a protocol classification to build an event stream from a packet flow in accordance with the disclosed embodiments.

FIG. 7 shows a flowchart illustrating the process of using configuration information associated with a protocol classification to build an event stream from a packet flow in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

First, one or more event attributes associated with the protocol classification are obtained from the configuration information (operation 702). For example, the event attribute(s) may be obtained from a portion of the configuration information that specifies the generation of an event stream from network data matching the protocol classification.

Next, the event attribute(s) are extracted from network packets in the packet flow (operation 704). For example, the event attribute(s) may be used to generate event data from the network packets. The configuration information may optionally be used to transform the extracted event attribute(s) (operation 706). For example, the configuration information may be used to aggregate the event data into aggregated event data that reduces the volume of event data generated while retaining the important aspects of the event data.

Finally, the extracted and/or transformed event attributes are included in the event stream (operation 708). For example, the event stream may be include a series of events and/or aggregated events that contain event attributes that are relevant to the protocol classification of the network packets represented by the events.

Figure 8:
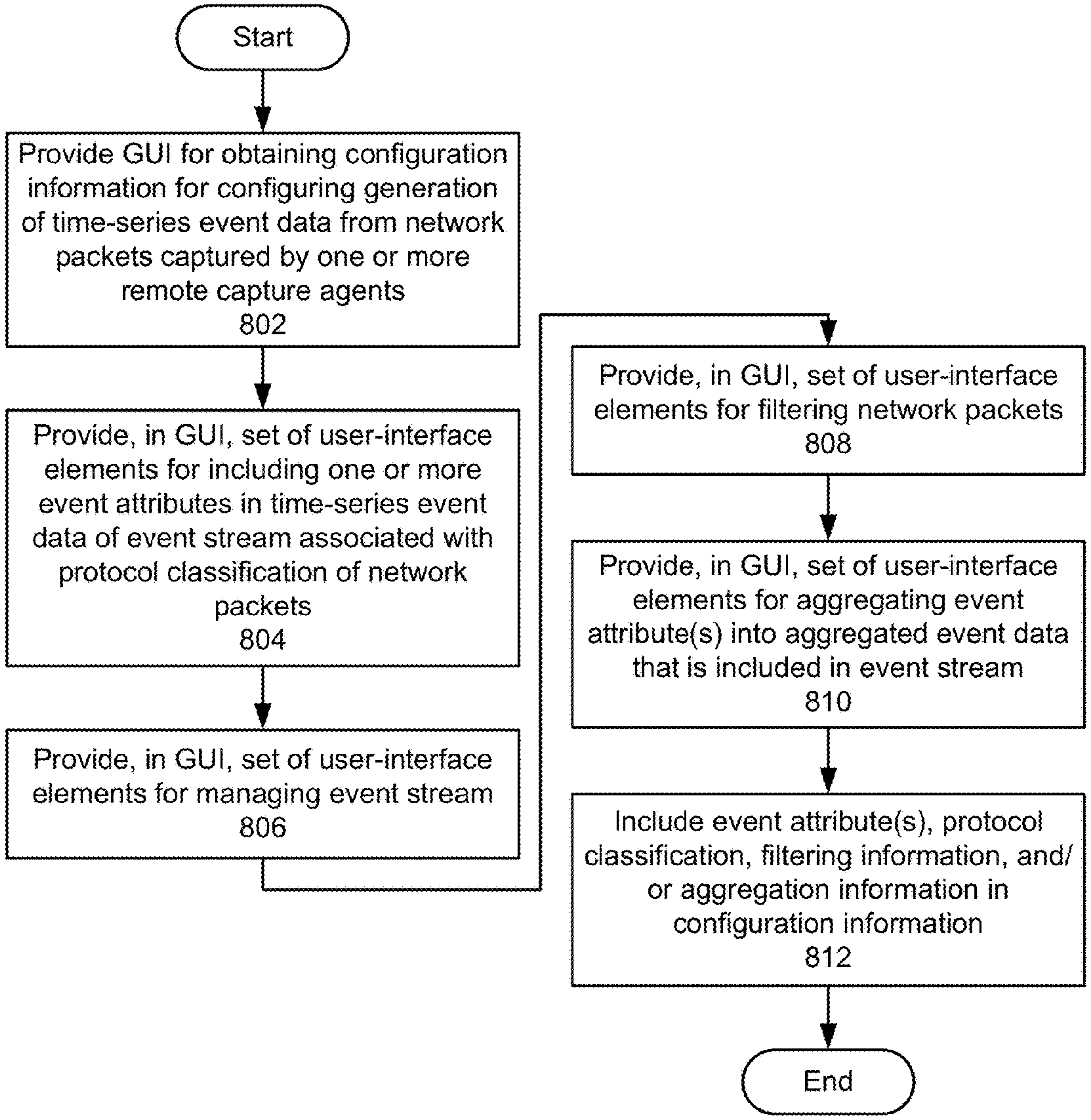
FIG. 8 shows a flowchart illustrating the process of facilitating the processing of network data in accordance with the disclosed embodiments.

FIG. 8 shows a flowchart illustrating the process of facilitating the processing of network data in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the embodiments.

First, a GUI for obtaining configuration information for configuring the generation of time-series event data from network packets captured by one or more remote agents is provided (operation 802). The GUI may include a number of user-interface elements for streamlining the creation and/or update of the configuration information. First, the GUI may provide a set of user-interface elements for including one or more event attributes in the time-series event data of an event stream associated with a protocol classification of the network packets (operation 804). For example, the GUI may include a set of checkboxes that enable the selection of individual event attributes for inclusion in the time-series event data.

Second, the GUI may provide a set of user-interface elements for managing the event stream (operation 806) and/or obtaining the protocol classification for the event stream. For example, the GUI may include one or more user-interface elements for cloning the event stream from an existing event stream, which imparts the protocol classification of the existing event stream on the cloned event stream. The GUI may also include user-interface elements for deleting the event stream, enabling the event stream, and/or disabling the event stream.

Third, the GUI may provide a set of user-interface elements for filtering the network packets (operation 808) prior to generating the time-series event data from the network packets. Each filter may identify an event attribute, a comparison to be performed on the event attribute, and/or a value to which the event attribute is to be compared. For example, the filter may match the event attribute to a Boolean value (e.g., true or false), perform a numeric comparison (e.g., equals, greater, less than, greater than or equal to, less than or equal to), and/or verify the definition of (e.g., the existence of) the event attribute in network data. The filter may also compare the event attribute to a regular expression, perform an exact match of the event attribute to the value, perform a partial match of the event attribute to the value, and/or determine the event attribute's position in an ordering.

Fourth, the GUI may provide a set of user-interface elements for aggregating the event attribute(s) into aggregated event data that is included in the event stream (operation 810). For example, the GUI may provide user-interface elements for identifying event attributes as key attributes used to generate a key representing the aggregated event data and/or aggregation attributes to be aggregated prior to inclusion in the aggregated event data. The GUI may also include one or more user-interface elements for obtaining an aggregation interval over which the one or more event attributes are aggregated into the aggregated event data.

Finally, the event attribute(s), protocol classification, filtering information, and/or aggregation information obtained from the GUI are included in the configuration information (operation 812). The configuration information may then be used to configure the protocol-based capture, filtering, and/or aggregation of network data at the remote capture agent(s).

Figure 9:
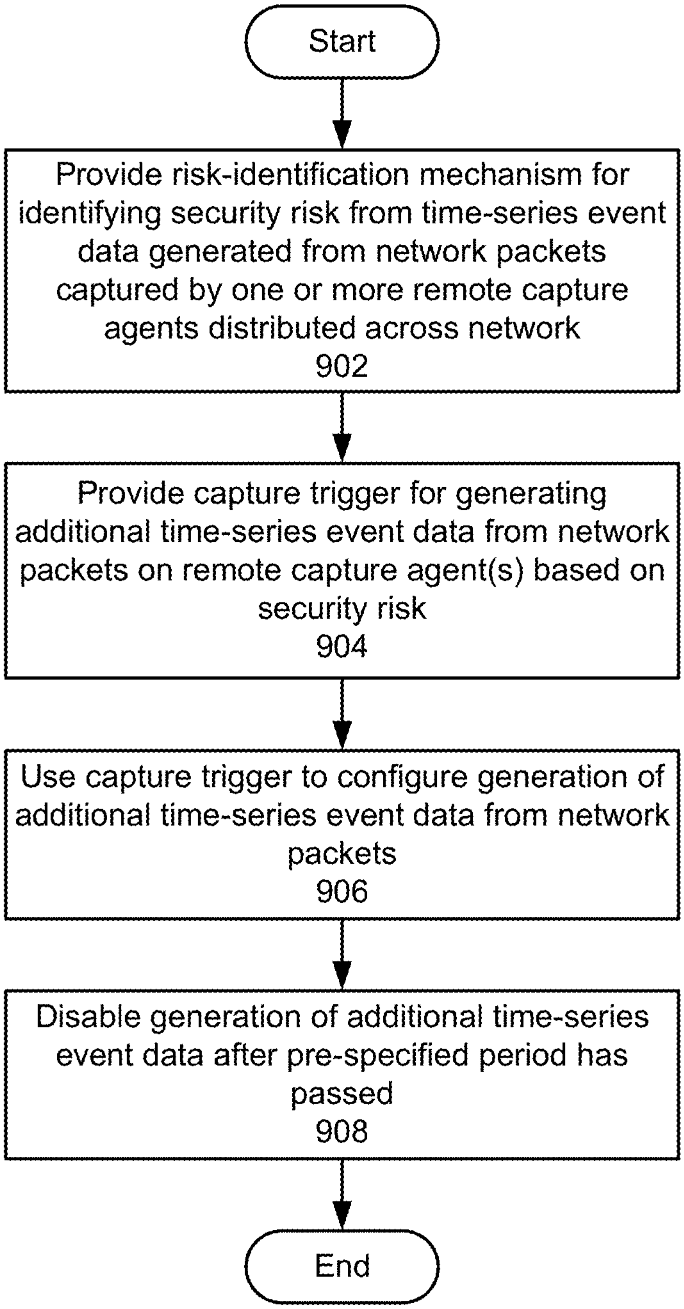
FIG. 9 shows a flowchart illustrating the process of facilitating the processing of network data in accordance with the disclosed embodiments.

FIG. 9 shows a flowchart illustrating the process of facilitating the processing of network data in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the embodiments.

Initially, a risk-identification mechanism for identifying a security risk from time-series event data generated from network packets captured by one or more remote capture agents distributed across a network is provided (operation 902). The risk-identification mechanism may include a GUI that displays an event of interest related to the security risk. For example, the GUI may show potential security risks in a dashboard and/or other visualization of the time-series event data. Alternatively, the risk-identification mechanism may include a search and/or recurring search for a subset of the time-series event data matching the security risk. For example, the risk-identification mechanism may include a search mechanism that allows a user to search for threats, attacks, errors, and/or other notable events in the time-series event data.

Next, a capture trigger for generation additional time-series data from the network packets on the remote capture agent(s) based on the security risk is provided (operation 904). The capture trigger may be received through one or more user-interface elements of a GUI, such as the same GUI used to provide the risk-identification mechanism. For example, the capture trigger may be activated in a portion of the GUI that is above, below, and/or next to a dashboard that displays security risks to the user. Alternatively, the capture trigger may be linked to a recurring search for time-series event data that matches a security risk. As a result, the capture trigger may automatically be activated once time-series event data matching the security risk is found.

After the capture trigger is activated, the capture trigger is used to configure the generation of the additional time-series event data from the network packets (operation 906). For example, activation of the capture trigger may result in the updating of configuration information for the remote capture agent(s), which causes the remote capture agent(s) to generate additional event streams containing event attributes associated with protocols that facilitate analysis of the security risk.

Finally, generation of the additional time-series event data is disabled after a pre-specified period has passed (operation 908). For example, generation of the additional time-series event data may be set to expire a number of hours or days after the capture trigger is activated. The expiry may be set by the user and/or based on a default expiration for security-based capture of additional network data from network packets.

Figure 10:
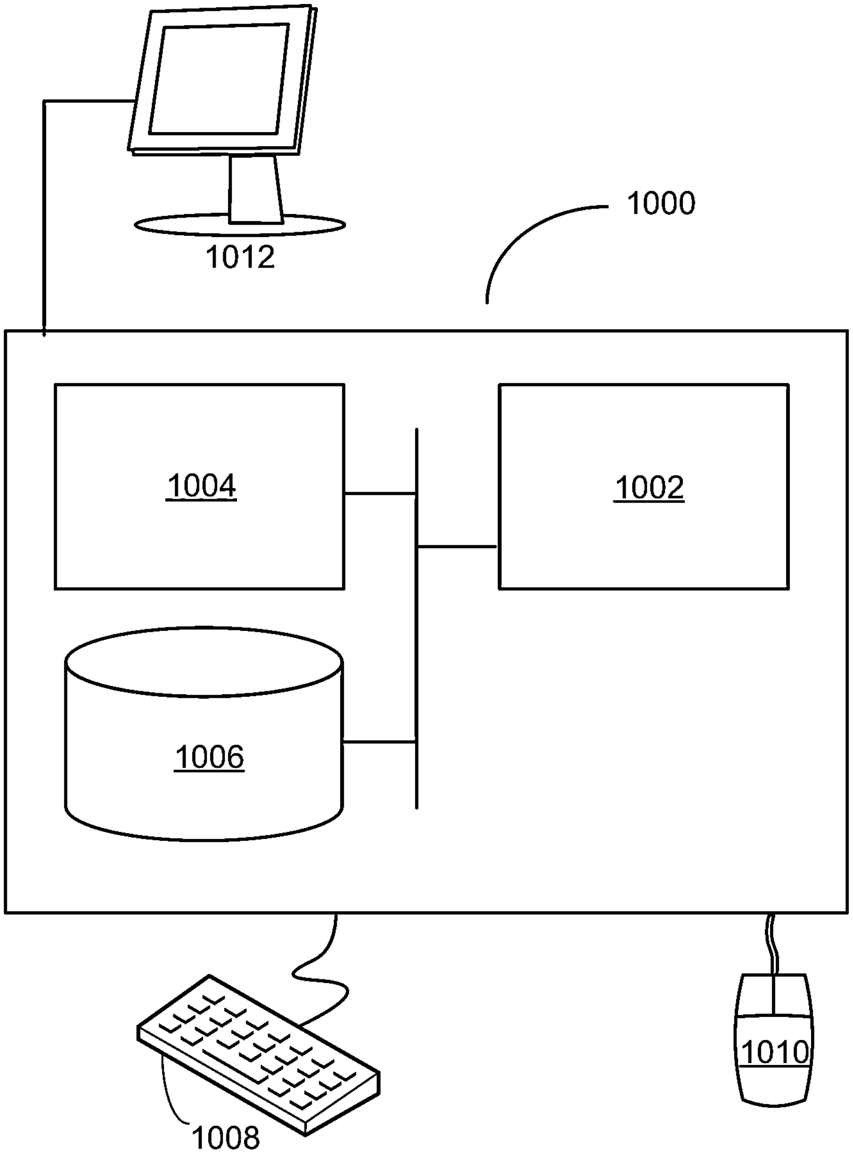
FIG. 10 shows a computer system in accordance with the disclosed embodiments.

FIG. 10 shows a computer system 1000 in accordance with the disclosed embodiments. Computer system 1000 includes a processor 1002, memory 1004, storage 1006, and/or other components found in electronic computing devices. Processor 1002 may support parallel processing and/or multi-threaded operation with other processors in computer system 1000. Computer system 1000 may also include input/output (I/O) devices such as a keyboard 1008, a mouse 1010, and a display 1012.

Computer system 1000 may include functionality to execute various components of the disclosed embodiments. In particular, computer system 1000 may include an operating system (not shown) that coordinates the use of hardware and software resources on computer system 1000, as well as one or more applications that perform specialized tasks for the user. To perform tasks for the user, applications may obtain the use of hardware resources on computer system 1000 from the operating system, as well as interact with the user through a hardware and/or software framework provided by the operating system.

In one or more embodiments, computer system 1000 provides a system for facilitating the processing of network data. The system may include a remote capture agent. The remote capture agent may obtain a first protocol classification for a first packet flow captured at the remote capture agent and use configuration information associated with the first protocol classification to build a first event stream from the first packet flow at the remote capture agent. The remote capture agent may also transmit the first event stream over a network for subsequent storage and processing of the first event stream by one or more components on the network. The remote capture agent may further obtain a second protocol classification for a second packet flow captured at the remote capture agent, use configuration information associated with the second protocol classification to build a second event stream from the second packet flow at the remote capture agent, and transmit the second event stream over the network.

The system may also provide a configuration server that provides the configuration information to the remote capture agent. The configuration server may provide a GUI for obtaining configuration for configuring the generation of time-series event data from network packets captured by the remote capture agent. The GUI may include user-interface elements for including one or more event attributes in the time-series event data of an event stream associated with a protocol classification of the network packets. The GUI may also include user-interface elements for managing the event stream, filtering the network packets, and/or aggregating the event attributes into aggregated event data.

The system may additionally provide a risk-identification mechanism for identifying a security risk from the time-series event data generated by the remote capture agent. Finally, the system may provide a capture trigger for generating additional time-series event data from the network packets on the remote capture agent based on the security risk. The additional time-series data may include one or more event attributes for facilitating analysis of the security risk, such as an event attribute associated with a protocol that facilitates analysis of the security risk.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method comprising:

receiving, by a configuration server coupled to a remote capture agent via one or more networks, input requesting creation of an event stream to be generated by the remote capture agent, wherein the input identifies:

an application-layer protocol for the event stream, wherein the application-layer protocol is found within network traffic monitored by the remote capture agent, and an application-layer event attribute, wherein the application-layer event attribute is associated with the application-layer protocol and is to be used by the remote capture agent as an aggregation attribute, and wherein the application-layer event attribute indicates data to be extracted from application-layer events constructed by the remote capture agent from the network traffic based on the application-layer protocol;

generating configuration data based on the input; and sending the configuration data to the remote capture agent, wherein the configuration data causes the remote capture agent to generate the event stream based on the network traffic monitored by the remote capture agent and according to the configuration data.

2. The computer-implemented method of claim 1, wherein the application-layer event attribute is generated by performing at least one of the following operations on data obtained from the network traffic: a sum, an average, a minimum, a maximum, or a summary statistic.

3. The computer-implemented method of claim 1, wherein the application-layer event attribute corresponds to a header associated with the application-layer events constructed by the remote capture agent from the network traffic.

4. The computer-implemented method of claim 1, wherein the remote capture agent generates an application-layer event in part by reordering network packets from the network traffic monitored by the remote capture agent.

5. The computer-implemented method of claim 1, wherein the remote capture agent generates the event stream based on encrypted network packets in the network traffic monitored by the remote capture agent.

6. The computer-implemented method of claim 1, further comprising sending, by the remote capture agent, the event stream to another component on the network for subsequent processing.

7. The computer-implemented method of claim 1, wherein the input further identifies a filtering rule indicating a type of events to include in the event stream generated by the remote capture agent.

8. The computer-implemented method of claim 1, further comprising obtaining, by the configuration server, a value from a look-up table based on data from an event in the event stream generated by the remote capture agent.

9. The computer-implemented method of claim 1, wherein the configuration data further specifies a transformation to be applied to event data to be included in the event stream, and wherein the method further comprises transforming the event data according to the transformation.

10. The computer-implemented method of claim 1, wherein the remote capture agent is installed in a cloud computing environment.

11. A non-transitory computer-readable storage medium having stored thereon instructions that, when executed by one or more processors, cause the one or more processors to perform operations including:

receiving, by a configuration server coupled to a remote capture agent via one or more networks, input requesting creation of an event stream to be generated by the remote capture agent, wherein the input identifies:

an application-layer protocol for the event stream, wherein the application-layer protocol is found within network traffic monitored by the remote capture agent, and an application-layer event attribute, wherein the application-layer event attribute is associated with the application-layer protocol and is to be used by the remote capture agent as an aggregation attribute, and wherein the application-layer event attribute indicates data to be extracted from application-layer events constructed by the remote capture agent from the network traffic based on the application-layer protocol;

generating configuration data based on the input; and sending the configuration data to the remote capture agent, wherein the configuration data causes the remote capture agent to generate the event stream based on the network traffic monitored by the remote capture agent and according to the configuration data.

12. The non-transitory computer-readable storage medium of claim 11, wherein the application-layer event attribute is generated by performing at least one of the following operations on data obtained from the network traffic: a sum, an average, a minimum, a maximum, or a summary statistic.

13. The non-transitory computer-readable storage medium of claim 11, wherein the application-layer event attribute corresponds to a header associated with the application-layer events constructed by the remote capture agent from the network traffic.

14. The non-transitory computer-readable storage medium of claim 11, wherein the remote capture agent generates an application-layer event in part by reordering network packets from the network traffic monitored by the remote capture agent.

15. The non-transitory computer-readable storage medium of claim 11, wherein the remote capture agent generates the event stream based on encrypted network packets in the network traffic monitored by the remote capture agent.

16. A configuration server, comprising:

a processor; and a non-transitory computer-readable medium having stored thereon instructions that, when executed by the processor, cause the configuration server to perform operations including:

receiving, by the configuration server coupled to a remote capture agent via one or more networks, input requesting creation of an event stream to be generated by the remote capture agent, wherein the input identifies:

an application-layer protocol for the event stream, wherein the application-layer protocol is found within network traffic monitored by the remote capture agent, and an application-layer event attribute, wherein the application-layer event attribute is associated with the application-layer protocol and is to be used by the remote capture agent as an aggregation attribute, and wherein the application-layer event attribute indicates data to be extracted from application-layer events constructed by the remote capture agent from the network traffic based on the application-layer protocol;

generating configuration data based on the input; and sending the configuration data to the remote capture agent, wherein the configuration data causes the remote capture agent to generate the event stream based on the network traffic monitored by the remote capture agent and according to the configuration data.

17. The configuration server of claim 16, wherein the application-layer event attribute is generated by performing at least one of the following operations on data obtained from the network traffic: a sum, an average, a minimum, a maximum, or a summary statistic.

18. The configuration server of claim 16, wherein the application-layer event attribute corresponds to a header associated with the application-layer events constructed by the remote capture agent from the network traffic.

19. The configuration server of claim 16, wherein the remote capture agent generates an application-layer event in part by reordering network packets from the network traffic monitored by the remote capture agent.

20. The configuration server of claim 16, wherein the remote capture agent generates the event stream based on encrypted network packets in the network traffic monitored by the remote capture agent.

* * * * *